(12) United States Patent
Mizera et al.

(10) Patent No.: US 12,438,841 B2
(45) Date of Patent: Oct. 7, 2025

(54) SECURITY ECOSYSTEM, DEVICE AND METHOD FOR CONTROLLING WORKFLOWS BASED ON NETWORK CONFIRMATION PROCESSES

(71) Applicant: MOTOROLA SOLUTIONS, INC., Chicago, IL (US)

(72) Inventors: Piotr Mizera, Cracow (PL); Thomas B. Bohn, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 578 days.

(21) Appl. No.: 17/711,591

(22) Filed: Apr. 1, 2022

(65) Prior Publication Data
US 2023/0319005 A1     Oct. 5, 2023

(51) Int. Cl.
| | |
|---|---|
| *H04L 51/23* | (2022.01) |
| *H04W 4/14* | (2009.01) |
| *H04W 4/06* | (2009.01) |

(52) U.S. Cl.
CPC ............ *H04L 51/23* (2022.05); *H04W 4/14* (2013.01); *H04W 4/06* (2013.01)

(58) Field of Classification Search
CPC ............ H04L 51/23; H04W 4/14; H04W 4/06
See application file for complete search history.

(56) References Cited

U.S. PATENT DOCUMENTS

| 6,175,743 | B1 | 1/2001 | Alperovich et al. | |
|---|---|---|---|---|
| 9,042,356 | B2 * | 5/2015 | Chowdhary | H04W 4/08 370/337 |
| 9,160,729 | B2 * | 10/2015 | Lyman | H04W 12/64 |
| 9,647,971 | B2 | 5/2017 | Cook et al. | |
| 9,699,637 | B1 | 7/2017 | Dabbs, III et al. | |
| 2020/0274962 | A1 * | 8/2020 | Martin | H04W 4/02 |

FOREIGN PATENT DOCUMENTS

| DE | 10032055 A1 | 2/2002 | |
|---|---|---|---|
| EP | 0782356 A2 | 7/1997 | |
| WO | WO-2017139281 A1 * | 8/2017 | ............... G06F 9/44 |

* cited by examiner

Primary Examiner — Ankur Jain
(74) Attorney, Agent, or Firm — PERRY +CURRIER INC.

(57) ABSTRACT

A security ecosystem, device and method for controlling workflows based on network confirmation processes is provided. A first device receives, from a second device, a message for delivery to a talkgroup on a given network, the second device executing a safety workflow comprising: a trigger that caused transmission of the; and one or more responsive actions that depend on whether transmission/delivery of the message to the talkgroup is successful or unsuccessful. The first device selects a mechanism for determining success or failure of transmission/delivery of the message based on a message confirmation process of the given network. The first device provides, to the given network, the message for delivery to the talkgroup and receives a reply to the message. The first device provides, to the second device, an indication of success or failure of transmission/delivery of the message, based on the reply and the mechanism selected.

20 Claims, 16 Drawing Sheets

SECURITY ECOSYSTEM, DEVICE AND METHOD FOR CONTROLLING WORKFLOWS BASED ON NETWORK CONFIRMATION PROCESSES

BACKGROUND OF THE INVENTION

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system may have to be configured to provide the notifications to the radios and the video security system may have to be configured to provide the notifications to the radios. Thus, both the access control system and the video security system may need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem may be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures.

Such automated workflows may also be useful to manage and monitor delivery and/or transmission of messages, such as text messages transmitted on talkgroups.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
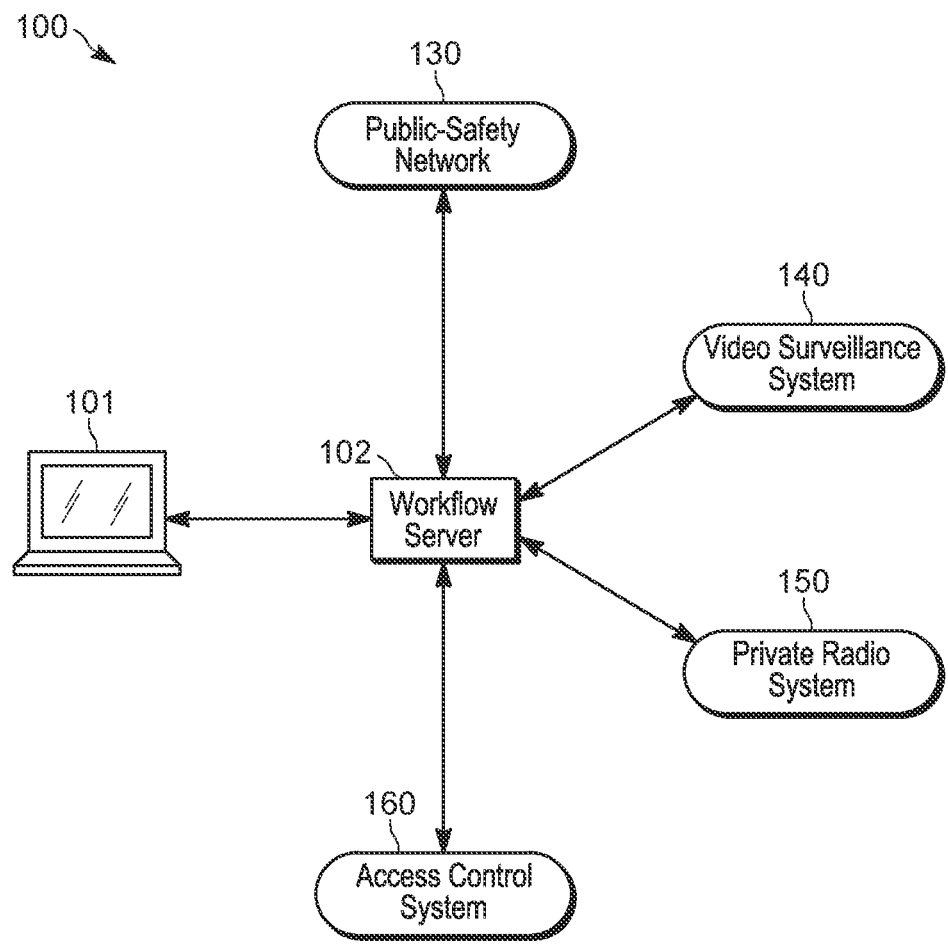
FIG. 1 depicts a security ecosystem capable of configuring and automating workflows, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a system, method, and apparatus for implementing workflows across multiple differing systems and devices is provided herein. During operation, a computing device, such as a workflow server, may monitor one or more triggers that occur in the differing systems and devices based on sensor data generated by, and received from one or more sensors, and, in response, implement one or more actions that may include communicating with one or more communication devices across the differing systems and devices, for example to dispatch security personnel associated with the one or more communication devices to locations at which the sensor data was collected that lead to the triggers.

Hence, provided herein is a computing device, for example in the form a workflow server interacting with a workstation, which monitors execution of a safety workflow and/or a plurality of safety workflows. A safety workflow is understood to include an association between a trigger, which occurs when certain conditions are met as determined using sensor data from a physical sensor, and an action, which occurs in response to the trigger and which may include at least an electronic interaction and/or communication with a communication device. One example trigger may comprise determining that a given door is open (e.g., and/or has been open for a given time period) and a responsive action may comprise communicating with a given communication device to dispatch security personnel operating the communication device to the location of the open door.

The computing device further provides, at a display screen (e.g., of the workstation), an indication of a safety work flow and respective visual indications of a physical sensor that generated sensor data of a trigger of the safety workflow and a communication device associated with a responsive action to the trigger. An input device may be used to detect an interaction with one or more of the respective visual indications to one or more of retrieve the sensor data, communicate with the communication device, and send the sensor data to the communication device.

Some workflows provided herein may be conditional. For example, an action may occur in a workflow which may have different results. Depending on a result, different responsive actions may occur. In particular, a trigger may cause an action that includes a message being transmitted to a talkgroup. Further responsive actions may occur depending on whether one or more of transmission or delivery of the message to the talkgroup succeeds or fails. However, different networks may have different mechanisms for determining success or failure of one or more of transmission or delivery of messages. Put another way, a given network may have an associated message confirmation process, and determining for determining success or failure of one or more of transmission or delivery of messages may depend on such a mechanism (which may also define certain capabilities of the given network).

However, it may be challenging to communicate with the one or more communication devices and/or to confirm that such one or more communication devices have received messages; indeed, in some instances, control of a safety workflow may depend on whether or not such communication devices have received messages. Thus, there exists a need for an improved technical system, device, and system for controlling workflows based on network confirmation processes.

In particular, communication devices to which messages may be transmitted may communicate via talkgroups. However, some types of networks (e.g. digital communication networks) may support talkgroup affiliation while other types of networks may not support talkgroup affiliation. For networks that do no support talkgroup affiliation, determining whether or not a communication device has received a message (e.g. such as a text message) may be challenging as such networks may not generally support polling for acknowledgements of receipt of messages. As communication devices may join talkgroups (e.g. tune into particular radio channels) regardless of a network on which the communication devices are communicating, it can hence be difficult to determine whether a message transmitted to a talkgroup has been received or not.

Hence, provided herein is a security ecosystem, device and method for controlling workflows based on network confirmation processes. In particular, a mechanism for determining success or failure of one or more of transmission or delivery of the message may be selected based on a message confirmation process of a given network over which a message is to be transmitted as a result of a trigger of a workflow.

An aspect of the present specification provides a method comprising: receiving, at a first computing device, from a second computing device, a message for delivery to a talkgroup on a given network, the second computing device executing a safety workflow, the safety workflow comprising: a trigger that caused transmission of the message to the talkgroup; and one or more responsive actions that depend on whether one or more of transmission or delivery of the message to the talkgroup is successful or unsuccessful; selecting, at the first computing device, a mechanism for determining success or failure of one or more of transmission or delivery of the message based on a message confirmation process of the given network; providing, from the first computing device, to the given network, the message for delivery to the talkgroup; receiving, at the first computing device, from the given network, a reply to the message; and providing, to the second computing device an indication of success or failure of one or more of transmission or delivery of the message, the indication based on the reply and the mechanism selected, the indication causing a responsive action, of the one or more responsive actions, to occur.

Another aspect of the present specification provides a device comprising: a network interface; and a processor configured to: receive, from a second computing device, via the network interface, a message for delivery to a talkgroup on a given network, the second computing device executing a safety workflow, the safety workflow comprising: a trigger that caused transmission of the message to the talkgroup; and one or more responsive actions that depend on whether one or more of transmission or delivery of the message to the talkgroup is successful or unsuccessful; select a mechanism for determining success or failure of one or more of transmission or delivery of the message based on a message confirmation process of the given network; provide, from the first computing device, to the given network, via the network interface, the message for delivery to the talkgroup; receiving, from the given network, via the network interface, a reply to the message; and provide, via the network interface, an indication of success or failure of one or more of transmission or delivery of the message, the indication based on the reply and the mechanism selected, the indication causing a responsive action, of the one or more responsive actions, to occur.

Each of the above-mentioned aspects will be discussed in more detail below, starting with example system and device architectures of the system in which the embodiments may be practiced, followed by an illustration of processing blocks for achieving an improved security ecosystem, device and method for controlling workflows based on network confirmation processes.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Turning now to the drawings, wherein like numerals designate like components, FIG. 1 illustrates a security ecosystem 100 capable of configuring and automating workflows across multiple systems. The security ecosystem 100 is interchangeably referred to hereafter as the system 100. Furthermore, workflows as referred to herein may alternatively be referred as security workflows as workflows as referred to herein may be used to implement security-based action and/or security base processes.

The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

As shown, the security ecosystem 100 comprises a public-safety network 130, a video surveillance system 140, a private radio system 150, and an access control system 160. A workflow server 102 is coupled to each of the network 130 and the systems 140, 150, and 160. The workstation 101 is shown coupled to the workflow server 102, and is utilized to configure the workflow server 102 with workflows, for example as generated by a user. It should be noted that although the components in FIG. 1 are shown geographically separated, these components can exist within a same geographic area, such as, but not limited to a school, a hospital, an airport, a sporting event, a stadium, a factory, a warehouse and/or any other suitable location and/or building and the like. It should also be noted that although only the network 130 and the systems 140, 150, and 160 are shown in FIG. 1, many more networks and/or systems may be included in the security ecosystem 100 and/or any suitable number of networks and/or systems may be included in the security ecosystem 100.

The workstation 101 may comprise a computer configured to execute Motorola Solution™'s Orchestrate™ and Ally™ dispatch and incident management software or any other suitable workflow management and/or incident management software. As will be discussed in more detail below, the workstation 101 is configured to present a user with a plurality of triggers capable of being detected by the network 130 and the systems 140, 150, and 160 as well as present the user with a plurality of actions capable of being executed by the network 130 and the systems 140, 150, and 160. The user will be able to generate workflows and upload these workflows to the workflow server 102 based on the presented triggers and actions. While only one workstation 101, the system 100 may comprise a plurality of workstations 101.

The workflow server 102 may comprise a server running Motorola Solution™'s Command Central™ software suite comprising the Orchestrate™ platform. While the workflow server 102 is depicted as one device, the workflow server 102 may be implemented as one or more computing devices, one or more servers, one or more cloud computing devices, and the like, and/or the functionality of the workflow server 102 may be geographically distributed.

The workflow server 102 is configured to receive workflows generated by the workstation 101 (and/or a plurality of workstations 101) and implement the workflows. Furthermore, the workflow server 102 may implement (e.g., concurrently, and the like) different workflows associated with different workstations. Particularly, the workflows are implemented by analyzing events detected by the network 130 and the systems 140, 150, and 160 and executing appropriate triggers. In a particular example, a user may generate a workflow on the workstation 101 that has a trigger comprising the video surveillance system 140 detecting a loitering event, and has an action comprising notifying radios within the public-safety network 130. When this workflow is uploaded to the workflow server 102, the workflow server 102 will notify the radios of any loitering event detected by the video surveillance system 140.

The public-safety network 130 is configured to detect various triggers and report the detected triggers to the workflow server 102. The public-safety network 130 is also configured to receive action commands from the workflow server 102 and execute the actions. In some examples, the public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from the workflow server 102.

The video surveillance system 140 is configured to detect various triggers and report the detected triggers to the workflow server 102. The video surveillance system 140 is also configured to receive action commands from the workflow server 102 and execute the actions. In one example, the video surveillance system 140 comprises a plurality of video cameras that may be configured to automatically change their field-of-views over time. The video surveillance system 140 is configured with a recognition engine/video analysis engine (VAE) that comprises a software engine that analyzes any video captured by the cameras using, for example, any suitable process which may include, but is not limited to machine learning algorithms, convolutional neural networks (CNNs), and the like. Using the VAE, the video surveillance system 140 is capable of "watching" video to detect any triggers and report the detected triggers to the workflow server 102. These triggers may include, but are not limited to, appearance searches and unusual Activity Detection (e.g., loitering). In a similar manner, the video surveillance system 140 is configured to execute action commands received from the workflow server 102. In some examples, the video surveillance system 140 comprises an Avigilon™ Control Center (ACC) server having Motorola Solution™'s Access Control Management (ACM)™ software suite.

The private radio system 150 may comprise a private enterprise radio system that is configured to detect various triggers and report the detected triggers to the workflow server 102. The private radio system 150 is also configured to receive action commands from the workflow server 102 and execute the actions. In some examples, the private radio system 150 comprises a MOTOTRBO™ communication system having radio devices that operate in the Citizens Broadband Radio Service (CBRS) spectrum and combines broadband data with voice communications.

The access control system 160 comprises an Internet-of-Things (IoT) network which may serve to connect every-day devices to the Internet. Devices such as cars, kitchen appliances, medical devices, sensors, doors, windows, HVAC (heating, ventilation, and air conditioning) systems, drones, . . . , etc. can all be connected through the IoT network of the access control system 160. Indeed, any suitable device that can be powered may be connected to the internet to control its functionality. The access control system 160 generally allows objects to be sensed or controlled remotely across existing network infrastructure. For example, the access control system 160 may be configured to provide access control to various doors and windows. In particular, the access control system 160 is configured to detect various triggers (e.g., door opened/closed) and report the detected triggers to the workflow server 102. The access control system 160 is also configured to receive action commands from the workflow server 102 and execute the action received from the workflow server 102. The action commands may take the form of instructions to lock, open, and/or close a door or window.

As is evident, the security ecosystem 100 allows an administrator using the workstation 101 to generate rule-based, automated workflows between technologies to enhance efficiency, and improve response times, effectiveness, and overall safety. The security ecosystem 100 generally has the capability to detect triggers across a number of devices within the network 130 and the systems 140, 150, and 160 and quickly take actions by automatically executing the proper procedure (i.e., executing the appropriate action once a trigger is detected).

The network 130 and the systems 140, 150, and 160 are next described in further detail.

Figure 2:
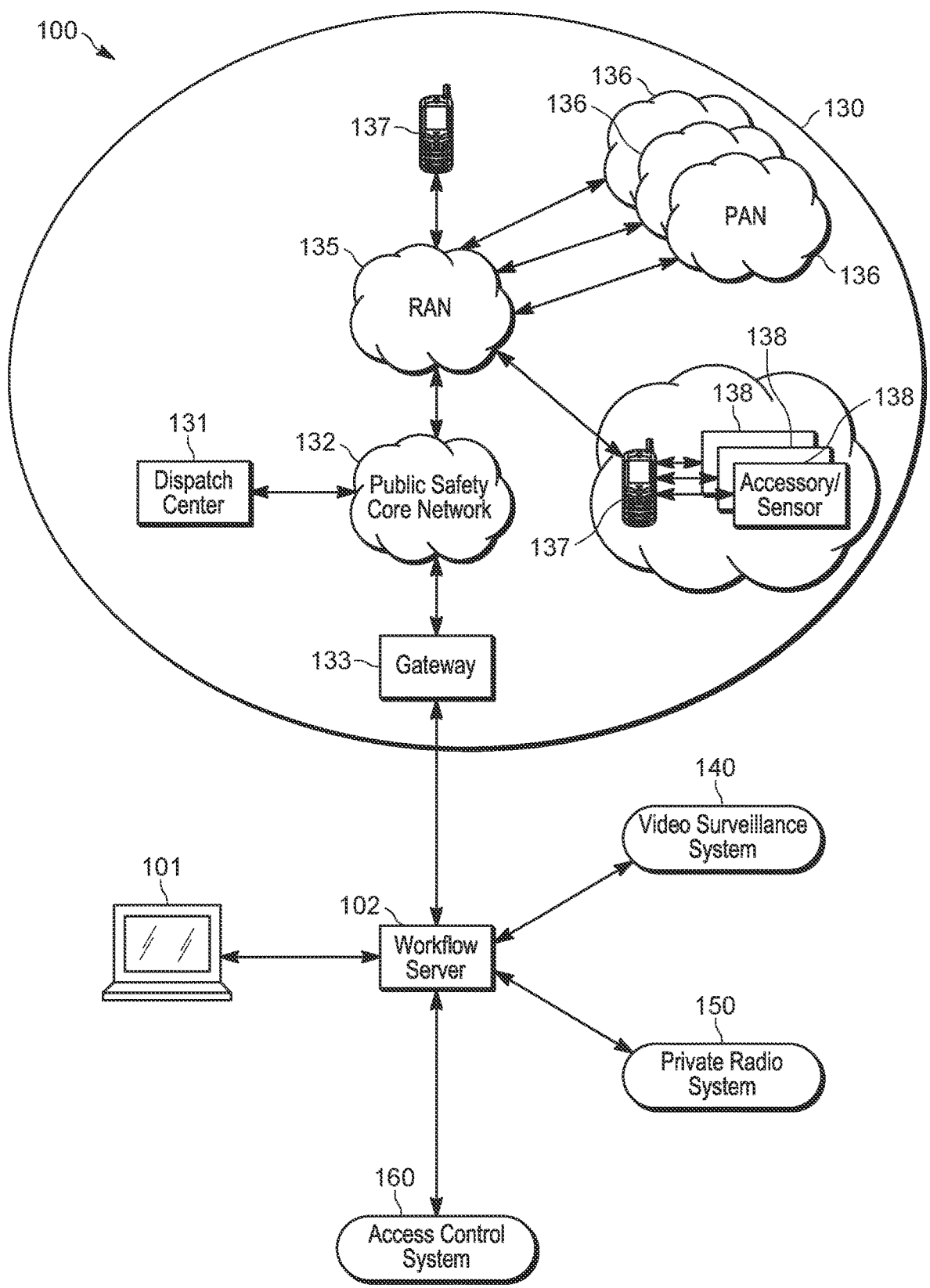
FIG. 2 depicts a security ecosystem capable of configuring and automating workflows, in accordance with some examples.

FIG. 2 illustrates a security ecosystem capable of configuring and automating workflows. In particular, FIG. 2 shows the security ecosystem 100 with an expanded view of the public-safety network 130. As shown, the public-safety network 130 comprises a dispatch center 131, a public-safety core network 132, a gateway 133, a radio access network (RAN) 135, a plurality of personal-area networks (PANs) 136, and at least one radio 137, such as a public-safety radio and the like (however the radios 137 may include, but are not limited to, any suitable combination of communication devices, such as mobile phones, two-way radios, and the like). As shown, each PAN 136 comprises a radio 137 acting as a hub to smart devices/accessories/sensor 138 (interchangeably referred to hereafter as the sensors and/or a sensor 138).

The gateway 133 may comprise an Avigilon™ Control Center running Avigilon's Access Control Management software (e.g. when the public-safety network 130 includes video cameras and/or the radios 137 include video cameras). The gateway 133 is configured to run any suitable Application Program Interface (API) to provide communications between the public-safety core network 132 and the workflow server 102.

A public safety officer (not shown in FIG. 2) may be equipped with sensors 138 that determine various physical and environmental conditions surrounding the public-safety officer. These conditions may be reported back to, for example, the dispatch center 131 or the workflow server 102 so an appropriate action may be taken. For example, police officers may have a sensor 138 (e.g., in the form of a gun-draw sensor) that determines when a gun is drawn. Upon detecting that an officer has drawn their gun, a notification may be sent back to the dispatch operator and/or the workflow server 102 so that, for example, other officers in the area may be notified of the situation.

It is envisioned that the public-safety officer may have an array of these sensors 138 available to the officer at the beginning of a shift. The officer may select and pull sensors 138 off a shelf, and form a personal-area network (PAN) 136 with the devices that may accompany the officer on their shift. For example, the officer may pull a gun-draw sensor, a body-worn camera, a wireless microphone, a smart watch, a police radio, smart handcuffs, a man-down sensor, a bio-sensor, and the like. All sensors 138 pulled by the officer may be configured to form a PAN 136 by associating (pairing) with each other and communicating wirelessly among the devices. At least one device may be configured with a digital assistant. In some examples, a PAN 136 comprises more than two sensors 138, so that many sensors 138 may be connected via a PAN 136 simultaneously.

A method called bonding may be used for recognizing specific sensors 138 and thus enabling control over which accessories are allowed to connect to each other when forming a PAN 136. Once bonded, accessories then can establish a connection without user intervention. A bond may be generated through a process called "pairing". The pairing process may be triggered by a specific request by the user to generate a bond from a user via a user interface on the accessories. Thus, as shown, public-safety network 130 incorporates PANs 136 generated as described above. In some examples, radios 137 and sensors 138 form a PAN 136, with communication links between sensors 138 and radios 137 taking place utilizing a short-range communication system protocol such as a Bluetooth communication system protocol. In this particular example, a PAN 136 may be associated with a single officer. Thus, FIG. 2 illustrates multiple PANs 136 associated with multiple officers (not shown).

The RAN 135 may include various RAN elements such as base stations, base station controllers (BSCs), routers, switches, and the like, arranged, connected, and programmed to provide wireless service to user equipment (e.g., the radios 137, and the like) in a manner known to those of skill in the relevant art. The RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other examples, the RAN 135 may implement a Long Term Evolution (LTE), LTE-Advance, or 5G protocol including multimedia broadcast multicast services (MBMS) or single site point-to-multipoint (SC-PTM) (including, but not limited to open mobile alliance (OMA) push to talk (PTT) over cellular (OMA-PoC)), a voice over IP (VoIP), an LTE Direct or LTE Device to Device, or a PTT over IP (PoIP) application may be implemented. In still further examples, the RAN 135 may implement a Wi-Fi protocol for example operating in accordance with an IEEE 802.11 standard (e.g., 802.11a, 802.11b, 802.11g) or a WiMAX protocol for example operating in accordance with an IEEE 802.16 standard.

The public-safety core network 132 may include one or more packet-switched networks and/or one or more circuit-switched networks, and in general provides one or more public-safety agencies with any suitable computing and communication needs, transmitting any suitable public-safety-related data and communications.

For narrowband LMR wireless systems, the public-safety core network 132 may operate in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some examples, group IDs (identifiers) may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (such as at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group.

In another example, communication devices may dynamically affiliate with a group (and also disassociate with the group) c based on user input, and the switching and/or radio network may track group membership and route new group calls according to the current group membership.

The radios 137 generally serve as PAN main devices, and may be any suitable computing and communication device configured to engage in wireless communication with the RAN 135 over the air interface as is known to those in the relevant art. Moreover, one or more radios 137 are further configured to engage in wired and/or wireless communication with one or more local sensor 138 via a local communication link. The radios 137 may be configured to determine when to forward information received from PA sensors 138 to, for example, a dispatch center or the workflow server 102.

Some examples of sensors 138 follow:

In some examples, a sensor 138 may comprise a sensor-enabled holster that maintains and/or provides state information regarding a weapon or other item normally disposed within the user's sensor-enabled holster. The sensor-enabled holster may detect a change in state (presence to absence) and/or an action (removal) relative to the weapon normally disposed within the sensor-enabled holster. The detected change in state and/or action may be reported to a radio 137 via its short-range transceiver, which may forward the state change to the dispatch center 131 or the workflow server 102. In some examples, the sensor-enabled holster may also detect whether the first responder's hand is resting on the weapon even if it has not yet been removed from the holster and provide such information to portable radio 137.

In some examples, a sensor 138 may comprise a biometric sensor (e.g., a biometric wristband) for tracking an activity of the user or a health status of a user, and may include one or more movement sensors (such as an accelerometer, magnetometer, and/or gyroscope) that may periodically or intermittently provide to a radio 137 indications of orientation, direction, steps, acceleration, and/or speed, and indications of health such as one or more of a captured heart rate, a captured breathing rate, and a captured body temperature of the user, for example accompanying other information. This information may be reported to a radio 137 which may forward the information to the dispatch center 131 and/or the workflow server 102.

In some examples, a sensor 138 may comprise an accelerometer to measure acceleration. Single and multi-axis models are available to detect magnitude and direction of the acceleration as a vector quantity, and may be used to sense orientation, acceleration, vibration shock, and falling. The accelerometer may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to a radio 137 which may forward the information to dispatch center 131 and/or the workflow server 102.

In some examples, a sensor 138 may comprise a heart rate sensor that uses electrical contacts with the skin to monitor an electrocardiography (EKG) signal of its wearer, or may use infrared light and imaging device to optically detect a pulse rate of its wearer, among other possibilities. This information may be reported to a radio 137 which may forward the information to the dispatch center 131 and/or the workflow server 102.

In some examples, a sensor 138 may comprise a breathing rate sensor 138 to monitor breathing rate. The breathing rate sensor may include use of a differential capacitive circuits or capacitive transducers to measure chest displacement and thus breathing rates. In other examples, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to a radio 137 which may forward the information to the dispatch center 131 and/or the workflow server 102.

The dispatch center 131 may comprise, and/or may be part of, a computer-aided-dispatch center (sometimes referred to as an emergency-call center or public-safety answering point), that may be manned by an operator providing any suitable dispatch operations. For example, the dispatch center 131 may comprise a graphical user interface that provides the dispatch operator any suitable information about public-safety officers. As discussed above, some of this information originates from sensors 138 providing information to radios 137, which forwards the information to the RAN 135 and ultimately to the dispatch center 131.

In a similar manner, information about public-safety officers may be provided to the workflow server 102. This information may originate from the sensors 138 providing information to the radios 137, which forwards the information to the RAN 135 and ultimately to the workflow server 102 via the public-safety core network 132 and the gateway 133. For example, a sensor 138 comprising a gun-draw sensor may send an indication to the workflow server 102 that a gun has been drawn. This may serve as a "trigger" for the workflow server 102 to initiate a particular "action", for example, notifying surrounding officers (for example on a particular talkgroup) by having their radios 137 provide an alarm indicating the triggering event. Thus, the workflow server 102 may provide instructions to any sensor 138 or radio 137 by sending an "action" to a sensor 138 in response to a trigger being received.

Figure 3:
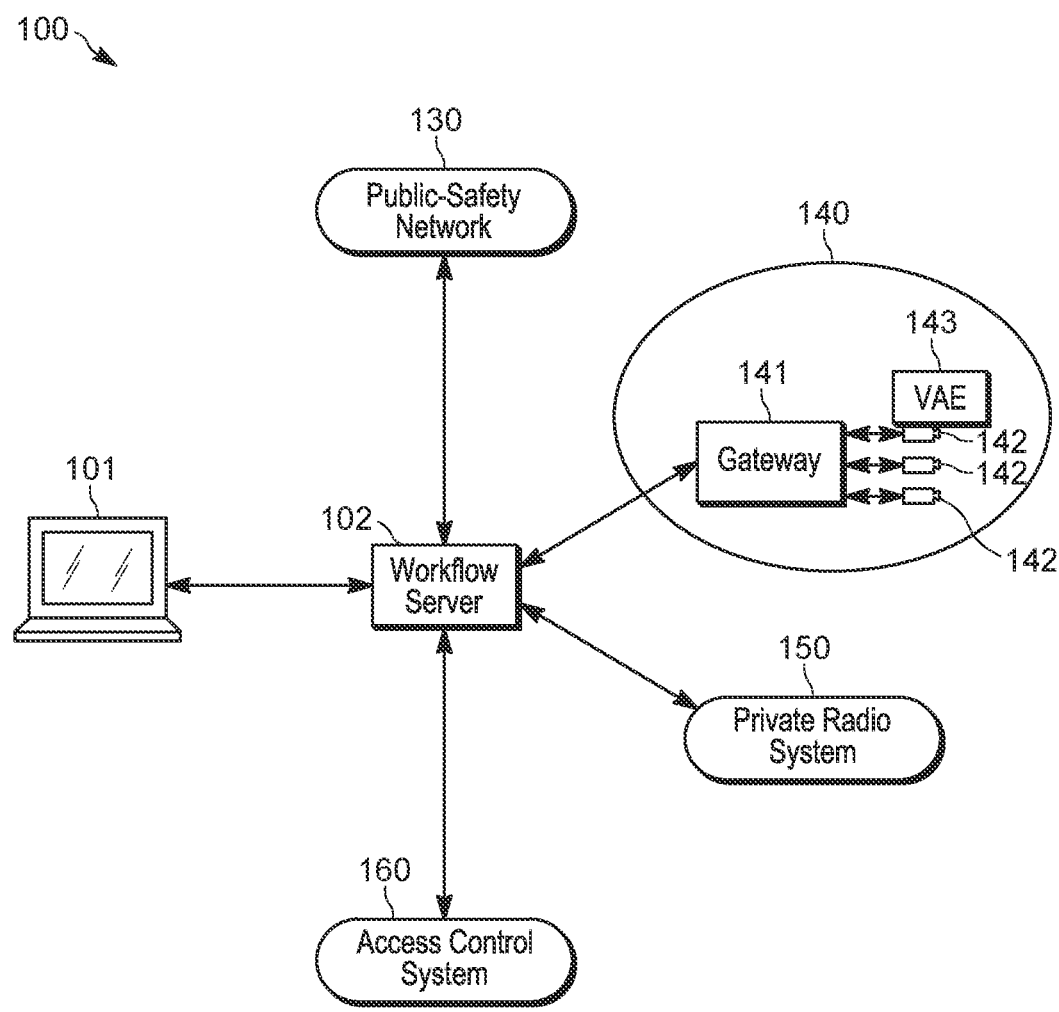
FIG. 3 depicts a security ecosystem capable of configuring and automating workflows, in accordance with some examples.

FIG. 3 illustrates a security ecosystem capable of configuring and automating workflows. In particular, FIG. 3 shows the security ecosystem 100 with an expanded view of the video surveillance system 140. As shown, the video surveillance system 140 comprises a plurality of image sensors and/or cameras 142 and a gateway 141.

Cameras 142 may be fixed or mobile, and may have pan/tilt/zoom (PTZ) capabilities to change their field-of-view. The cameras 142 are generally understood to comprise image sensors and hence may also be referred to as images sensors. Cameras 142 may also comprise circuitry configured to serve as a VAE 143 (only one of which is depicted in FIG. 3, though it is understood that any camera 142 may comprise circuitry configured to serve as a VAE 143). The VAE 143 comprises a software engine that analyzes analog and/or digital video. The VAE 143 is generally configured to "watch" video and detect pre-selected objects such as license plates, people, faces, automobiles. The VAE 143 may also be configured to detect certain actions of individuals, such as fighting, loitering, crimes being committed, . . . , etc. and/or actions of objects, such as speeding, a car driving on a pedestrian walkway, a car moving against the flow of traffic, . . . , etc.; however the VAE 143 may be configured to detect any suitable action. The VAE 143 may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires. Combinations of object detectors may be utilized to detect combinations of objects, such as automobiles on fire, and the like, automobiles that are not on fire, and the like.

The gateway 141 may comprise an Avigilon™ Control Center running Avigilon's Access Control Management software. The gateway 141 is configured to run any suitable Application Program Interface (API) to provide communications between any cameras 142 and the workflow server 102.

Figure 4:
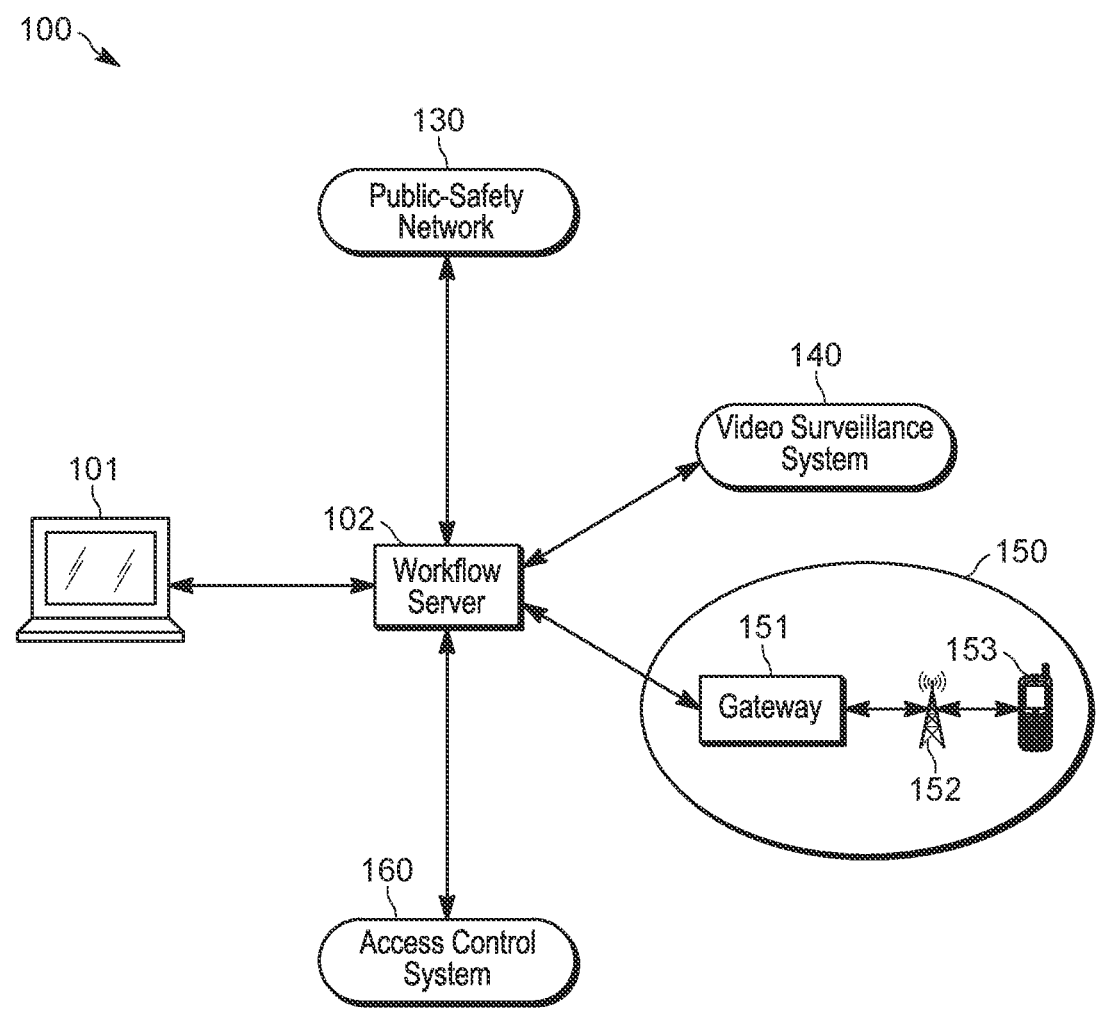
FIG. 4 depicts a security ecosystem capable of configuring and automating workflows, in accordance with some examples.

FIG. 4 illustrates a security ecosystem capable of configuring and automating workflows. In particular, FIG. 4 shows the security ecosystem 100 with an expanded view of the private radio system 150. As shown, the private radio system 150 comprises the gateway 151, system infrastructure 152, and at least one radio 153. Communications from the radio 153 to the workflow server 102 passes through the system infrastructure 152, the gateway 151, and ultimately to the workflow server 102.

The gateway 151 may comprise an Avigilon™ Control Center running Avigilon's Access Control Management software (e.g. when the private radio system 150 and/or the radios 153 include video cameras). The gateway 151 is configured to run any suitable Application Program Interface (API) to provide communications between any of the system infrastructure 152 and the workflow server 102.

The system infrastructure 152 comprises any suitable equipment to provide wireless communications to and from the radio 153. The system infrastructure 152 may comprise Motorola Solution™'s MOTOTRBO™ equipment, such as an SLR Series Repeater (e.g., SLR 1000, SLR 5000, or SLR8000 repeater) configured to provide two-way radio service to radio 153. However, the system infrastructure 152 may comprise one or more of a base station and/or base station controller and/or repeater.

Although only a single radio 153 is shown in FIG. 4, any suitable number of radios 153 may be present within the private radio system 150. Each radio 153 may comprise a MOTOTRBO™ two-way radio (such as a Motorola Solution™ XPR 5000 Series radio) with digital technology providing integrated voice and data communication.

Figure 5:
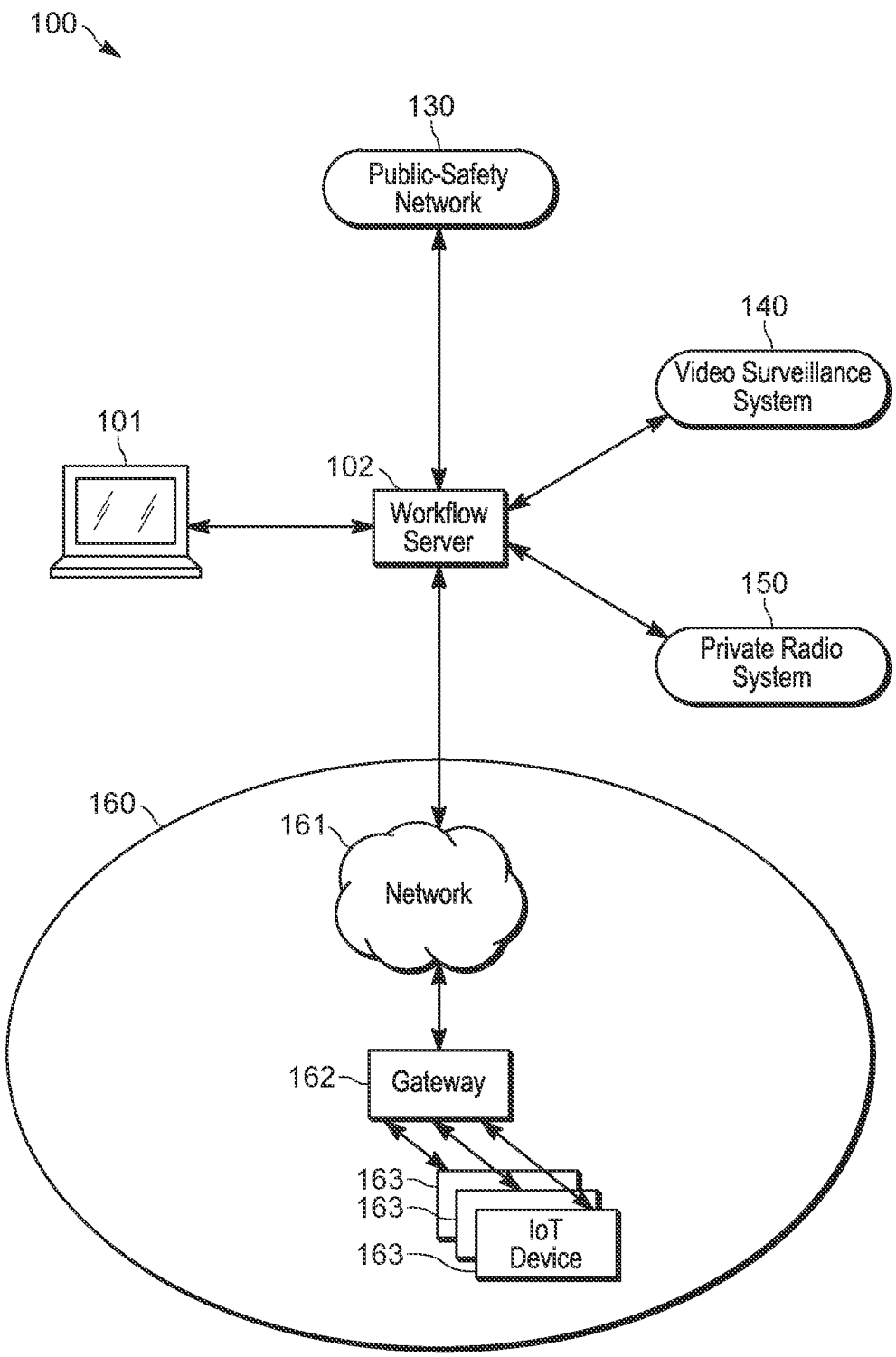
FIG. 5 depicts a security ecosystem capable of configuring and automating workflows, in accordance with some examples.

FIG. 5 illustrates a security ecosystem capable of configuring and automating workflows. In particular, FIG. 5 shows the security ecosystem 100 with an expanded view of the access control system 160. As shown, the access control system 160 comprises a gateway 162 and a plurality of IoT devices 163 coupled to the gateway 162. Data passed from the workflow server 102 to the IoT devices 163 passes through the network 161, the gateway 162 and ultimately to the IoT device 163. Conversely, data passed from the IoT devices 163 to the workflow server 102 passes through the gateway 162, the network 161, and ultimately to the workflow server 102.

The IoT devices 163 may comprise devices that control objects, doors, windows, sensors, and the like. Any particular suitable communication protocol (e.g., an IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFI- NET, DeviceNet, . . . , etc. can be used. Also a more generic protocol such as Coap, Mqtt, and RESTfull may also be used.

The gateway 162 may comprise an Avigilon™ Control Center running Avigilon's Access Control Management software. The gateway 162 is configured to run any suitable Application Program Interface (API) to provide communications between any IoT device 163 and the workflow server 102.

The network 161 may comprise one of many networks used to transmit data, including, but not limited to, a network employing one of the following protocols: conventional, or trunked LMR standard or protocol such as ETSIDMR, a standard defined by the APCO, TETRA, or other LMR radio protocols or standards; LTE protocol, LTE-Advance protocol, or 5G protocol including multimedia broadcast MBMS or SC-PTM protocol (including, but not limited to an OMA-PTT OMA-PoC), a VoIP protocol, an LTE Direct or LTE Device to Device protocol, or a PoIP protocol, a Wi-Fi protocol for example operating in accordance with an IEEE 802.11 standard (e.g., 802.11a, 802.11b, 802.11g) or a WiMAX protocol for example operating in accordance with an IEEE 802.16 standard.

Figure 6:
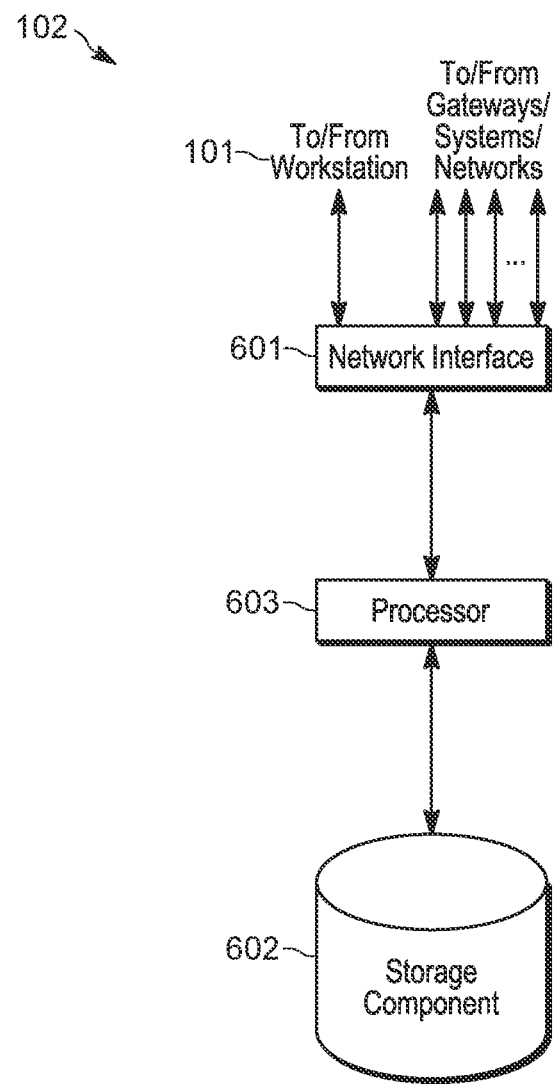
FIG. 6 is a block diagram of a workflow server of FIG. 1, in accordance with some examples.

FIG. 6 is a block diagram of the workflow server 102 of FIG. 1. As shown, the workflow server 102 comprises a network interface 601, a storage component 602 (e.g., as depicted a database, but may comprise any suitable memory and/or storage component), and a processor 603. The processor 603 is understood to include any suitable logic circuitry.

The network interface 601 includes any suitable components for communicating with other suitable components of the system 100, in particular, as depicted, to the workstation 101, the gateways 133, 141, 151, 162 of the network 130 and the systems 140, 150, and 160, and the like. Components of the network interface 601 include any suitable processing, modulating, and transceiver components that are operable in accordance with any one or more standard or proprietary wireless interfaces, wherein some of the functionality of the processing, modulating, and transceiver components may be performed by means of the processor 603 through programmed logic such as software applications or firmware stored on the storage component 602 (e.g., standard random access memory) or through hardware. The network interface 601 may include any suitable wired or wireless network interfaces, including, but not limited to, Ethernet interfaces, T1 interfaces, USB interfaces, IEEE 802.11b interfaces, IEEE 802.11g interfaces, and the like.

The processor 603 may comprise a digital signal processor (DSP), general purpose microprocessor, a programmable logic device, or application specific integrated circuit (ASIC), and the like, and is generally configured to receive triggers from various gateways, systems, and networks (e.g., of the system 100). The processor 603 is further configured to execute (or cause to be executed) a particular action for a trigger that is received. More particularly, when the processor 603 receives a trigger from any network or system, the processor 603 may access the storage component 602 to determine an action for the particular trigger. Once an action has been determined, the processor 603 will execute the action, or cause the action to be executed. In order to perform the above, the processor 603 may execute an instruction set/software (e.g., Motorola Solution™'s Command Central™ software suite comprising the Orchestrate™ platform) which may be stored at the storage component 602.

The storage component 602 may comprise standard memory (such as Random Access Memory (RAM), Read Only Memory (ROM), and the like) and generally serves to store associations between triggers and actions. Examples of various triggers and actions are illustrated in in Table 1, below.

TABLE 1

Associations Between Triggers and Actions.

| Trigger | Action |
|---|---|
| Warehouse back door opened | Pan camera "342" to point at door |
| Man-Down sensor activated for Officer Smith | Notify dispatch center via emergency text message |
| ALPR for delivery truck | Open back gate |
| . . . etc. | . . . etc. |

Figure 7:
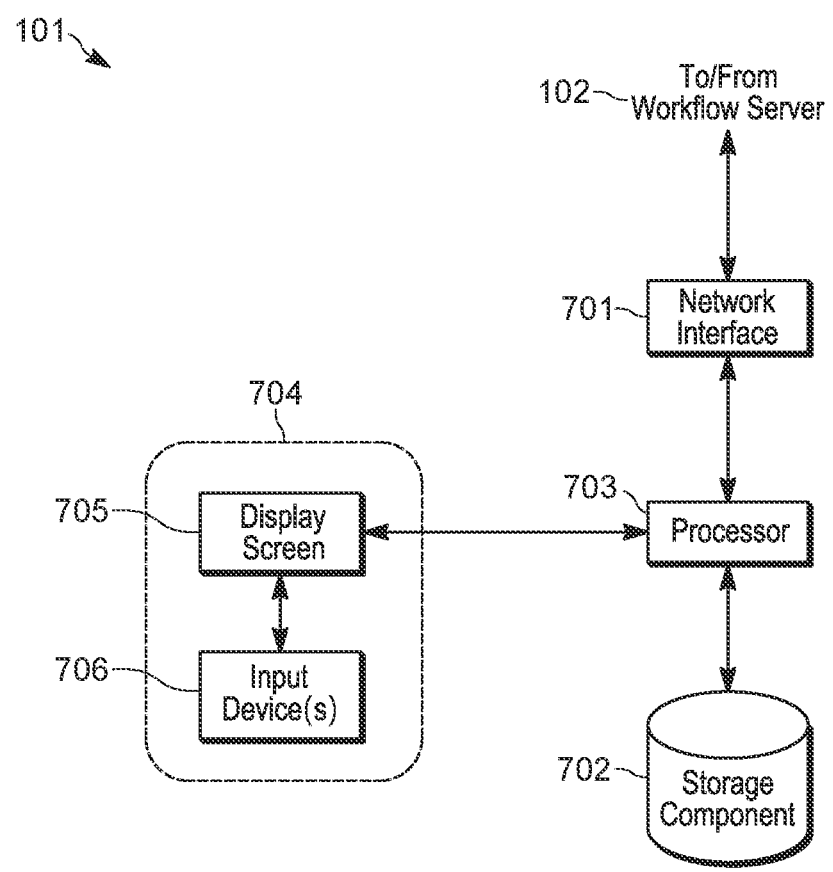
FIG. 7 is a block diagram of a workstation of FIG. 1 utilized to generate a workflow, in accordance with some examples.

FIG. 7 is a block diagram of the workstation 101 of FIG. 1 utilized to generate a workflow. As shown, the workstation 101 comprises a network interface 701, a storage component 702, a processor 703, and a graphical user interface (GUI) 704.

The network interface 701 includes any suitable components for communicating with other suitable components of the system 100, in particular, as depicted, to the workflow server 102. Components of the network interface 701 include any suitable processing, modulating, and transceiver components that are operable in accordance with any one or more standard or proprietary wireless interfaces, wherein some of the functionality of the processing, modulating, and transceiver components may be performed by means of the processor 703 through programmed logic such as software applications or firmware stored on the storage component 702 (e.g., standard random access memory) or through hardware. The network interface 701 may include any suitable wired or wireless network interfaces, including, but not limited to, Ethernet interfaces, T1 interfaces, USB interfaces, IEEE 802.11b interfaces, IEEE 802.11g interfaces, and the like.

Processor 703 may comprise a DSP), general purpose microprocessor, a programmable logic device, or an ASIC and may be configured to execute Motorola Solution™'s Orchestrate™ and Ally™ dispatch and incident management software which may be stored at the storage component 702. The execution of such software may allow users of the GUI 704 to generate workflows (i.e., actions and their associated responses) by receiving user inputs at the GUI 704 that define various triggers and their associated actions, which will ultimately be uploaded to the workflow server 102 and stored in the storage component 602.

The storage component 702 may comprise standard memory (such as RAM, ROM, and the like) and serves to store instructions as software. Particularly, Motorola Solution™'s Orchestrate™ and Ally™ dispatch and incident management software may be stored at the storage component 702.

The GUI 704 generally provides a man/machine interface for receiving an input from a user and displaying information. For example, the GUI 704 may provide a mechanism of conveying (e.g., displaying) user-generated workflows. Thus, the GUI 704 may also provide a mechanism for a user to input workflows into a displayed form. In order to provide the above features (and additional features), the GUI 704 may include any combination of a display screen 705 (e.g., a computer screen, which may include a touch screen, a monitor, and the like) and any suitable combination of one or more input devices 706 (e.g., a keyboard and mouse combination).

Figure 8:
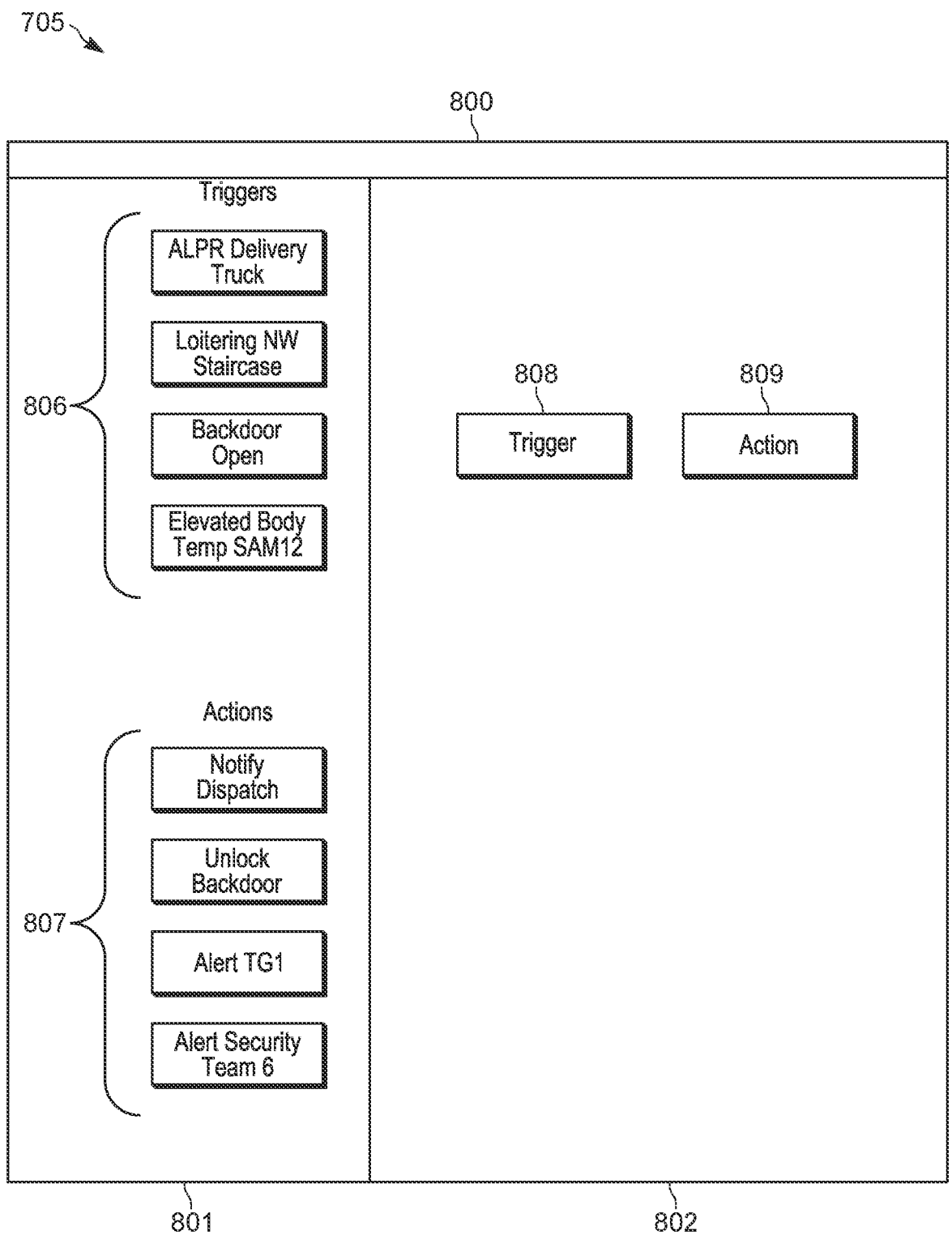
FIG. 8 depicts a dashboard for generating a workflow, in accordance with some examples.

FIG. 8 illustrates the generation of a workflow. More particularly, FIG. 8 illustrates a dashboard 800 rendered at the display screen 705 utilized for the generation of workflows. As depicted, the dashboard 800 consists of the following main components:

- a selection panel 801 (e.g., on a left-hand side), which lists available triggers 806 and actions 807;
- a workspace 802, which comprises a large area in the middle of the dashboard 800 used to generate workflows that define the connections between triggers and actions. Each workflow in the workspace is displayed as a separate field 808, 809 with an outline and a title. As shown in FIG. 8, two fields 808, 809 are shown, one labeled "trigger" and another labeled "action".

While the dashboard 800 is depicted in a particular configuration, the dashboard 800 may have any suitable configuration; for example, the selection panel 801 may be on a right-hand side, a top side or a bottom side relative to the workspace 802.

The triggers 806 represent the events originating from various sensors, software, and devices within the security ecosystem 100. The actions 807 represent the possible responses to the triggers that may be implemented via any suitable various sensors, software, and devices within the security ecosystem 100, including, but not limited to, the radios 137, 153.

After a workflow is deployed (i.e., uploaded to the workflow server 102), its actions activate when the triggers occur. Triggers and actions appear on the workspace after they are dragged and dropped from the triggers 806 and actions 807 tabs respectively. For example, as depicted, the field 808 represents a trigger 806 that may have been dragged and dropped to the workspace 802 and the field 809 represents an action 807 that may have been dragged and dropped to the workspace 802. Connecting the triggers and actions on the workspace (as described below) will generate a workflow.

The triggers 806 and the actions 807 are generally stored at the storage component 702 and represent integrations across multiple products. In other words, triggers 806 and the actions 807 comprise triggers and actions for any suitable components available in the security ecosystem 100. This includes cameras, sensors, IoT devices, radios, . . . , etc. As administrators add additional technology pieces to the security ecosystem 100, those pieces may be automatically made available for workflow generation as discussed herein.

In order to associate a trigger 806 with an action 807 in the workspace 802, a user selects a trigger 806 from all possible triggers 806, and drags and drops it onto workspace 802, as represented by the field 808. The user then selects an action 807 for the trigger 806 that is in the workspace 802, and drags and drops it onto workspace 802. Once in the workspace 802, a trigger 806 may be referred to as a trigger node, and an action 807 may be referred to as an action node. In order to associate the trigger 806 with the action 807, they are connected. To connect a trigger node to an action node, a user may click an end of the trigger node (e.g., that is closest to the action node) and drag a line to the action node, or vice versa. However, any suitable process for connecting nodes is within the scope of the present specification.

Figure 9:
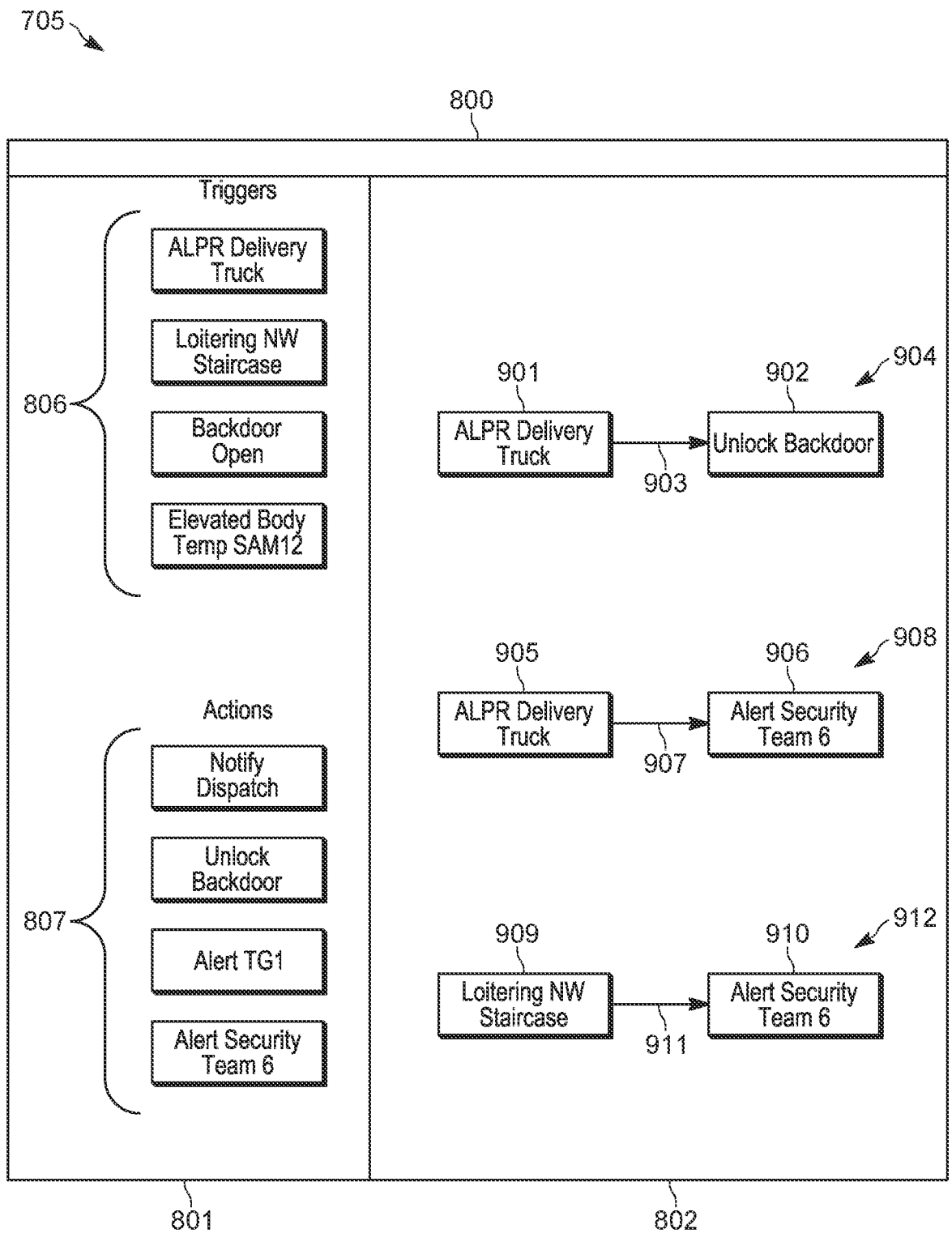
FIG. 9 depicts the dashboard of FIG. 8 with an example workflow, in accordance with some examples.

As shown in FIG. 9, which depicts the dashboard 800 in use, a trigger "ALPR Delivery Truck" 901 has been associated with an action "Unlock Backdoor" 902 by dragging a line 903 between the two, thereby forming a workflow 904.

While only one trigger 901 and one action 902 is depicted in the workflow 904, the workflow 904 may comprise any suitable number of triggers (e.g., a trigger group) and any suitable numbers of associated action (e.g., an action group). Hence, if any of the triggers within a trigger group occurs, the workflow 904 is initiated causing the action to be executed. For example, as depicted ALPR stands for automated license plate reader, which may be one of the IoT devices 163; as such, according to the workflow 904, when automated license plate reader of the access control system 160 "reads" a license plate of a delivery truck (e.g., the trigger 901), an associated backdoor (e.g., of a warehouse) is opened; such a backdoor may also comprise one of the IoT devices 163. While note depicted, a memory in the system 100 may also store a list of license plates for which the backdoor is to be opened and the trigger 901 may include comparing a number of the license plate that is read with license plates in such a list, such that the backdoor is opened only when the license plate is on the list.

Furthermore, it is understood that the system 100 may comprise a plurality of IoT devices 163 that are automated license plate readers, and that the trigger 901 may be for a particular automated license plate reader; as such, while not depicted, the actions 807 may include respective "ALPR" actions 807 for other automated license plate reader. Similarly, it is understood that the system 100 may comprise a plurality of IoT devices 163 that are backdoors, and that the action 902 may be for a particular backdoor; as such, while not depicted, the actions 807 may include respective "Unlock Backdoor" actions 807 for other backdoors.

For example, as depicted the triggers 806 include a trigger 806 for detecting loitering at a particular "North West" (e.g., NW) staircase of a particular building (e.g., "Loitering NW Staircase") that may be detected using a VAE 143 of one or more cameras 142 and the like. The triggers 806 further includes a trigger 806 for detecting whether a particular backdoor is open (e.g., "Backdoor Open") that may be detected using a VAE 143 of one or more cameras 142 and/or an open/closed sensor on the backdoor and the like. The triggers 806 further includes a trigger 806 for detecting whether a particular individual, for example a first responder and/or police officer and/or security guard having an identifier "SAM12" has an elevated body temperature (e.g., "Elevated Body Temp SAM12") that may be detected using a biometric sensor of one or more sensors 138 and the like.

For example, as depicted the actions 807 include an action 807 for notifying a first responder and/or police and/or security dispatch (e.g., "Notify Dispatch") such as the dispatch center 131. The actions 807 further includes an action 807 for alerting a particular talkgroup identified by the identifier TG1 and/or Talkgroup #1 (e.g., "Alert TG1") such as a particular talkgroup of the radios 137 (and/or the radios 153). The actions 807 further includes an action 807 for alerting a particular security team identified by the identifier Security Team 6 (e.g., "Alert Security Team 6") which may be associated with a particular group of the radios 137 (and/or the radios 153) and which may, or may not, be associated via a talkgroup.

However, the triggers 806 and actions 807 may include any suitable triggers and actions, which may be dragged and dropped, and the like, into the workspace 802, and associated with each other to generate workflows.

For example, as also shown in FIG. 9, the trigger "ALPR Delivery Truck" 806 may be added to the workspace 802 a second time from the selection panel 801, as a trigger "ALPR Delivery Truck" 905, and associated with a different action "Alert Security Team 6" 906 (e.g., added as an action 807 from the selection panel 801) by dragging a line 907 between the two, thereby forming a workflow 908. Such an example illustrates that a given trigger 806 may be used more than once to generate a workflow 904, 908, in association with different actions 807. Similarly, a given action 807 may be used more than once in the workspace 802 to form workflows with different triggers 806.

Similarly, as also shown in FIG. 9, the trigger "Loitering NW Staircase" 806 may be added to the workspace 802 from the selection panel 801, as a trigger "Loitering NW Staircase" 909, and associated with action "Alert Security Team 6" 910 (e.g., added as an action 807 from the selection panel 801) by dragging a line 911 between the two, thereby forming a workflow 912. Such an example illustrates that a given action 807 may be used more than once to generate a workflow 908, 912, in association with different triggers 806.

Figure 10:
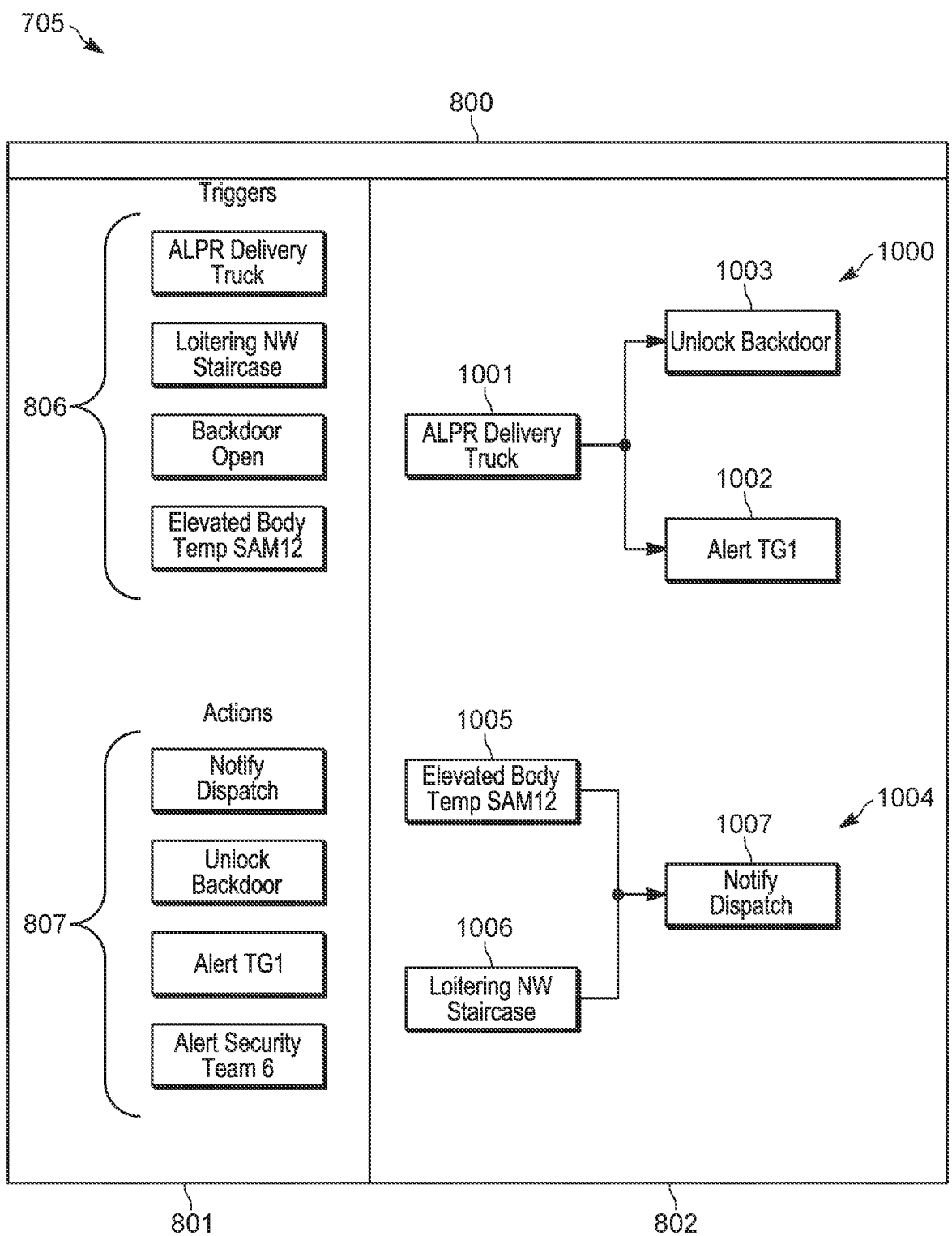
FIG. 10 depicts the dashboard of FIG. 8 with other example workflows, in accordance with some examples.

As illustrated in FIG. 10, a single trigger may be associated with multiple actions in a workflow. Thus, in an illustrated workflow 1000, a trigger 1001 of "ALPR Delivery Truck" may be associated with an action 1003 of "Unlock Back Door" 1003 as well as associated with an action 1002 of "Alert TG 1". When the workflow 1000 is uploaded to the workflow server 102, and the automatic license plate detects a delivery truck, workflow server 102 will cause both the back door to unlock and an alert to be sent on Talkgroup #1.

In a similar manner multiple triggers may be associated with a single action. Thus, in an illustrated workflow 1004, both a trigger 1005 of "Elevated Body Temp SAM 12" and a trigger 1006 of "Loitering NW Staircase" will cause an action 1007 of "Notify Dispatch" 1008. When the workflow 1004 is uploaded to the workflow server 102, the workflow server 102 notifies the dispatch center when either a police officer (and the like) identified by the identifier "SAM 12" has an elevated body temperature (e.g., above a threshold body temperature", or when loitering is detected in the NW staircase.

As mentioned above, it may be challenging to communicate to the one or more communication devices the sensor data that lead to the one or more triggers and/or to change and/or control the safety workflows.

In order to address such a problem, the workflow server 102 may be adapted to: monitor execution of a safety workflow, the safety workflow comprising one or more triggers and one or more responsive actions; provide, at a display screen, an indication of the safety workflow and respective visual indications of: a physical sensor that generated sensor data of a trigger of the safety workflow; and a communication device associated with a responsive action to the trigger; detect, via an input device, an interaction with one or more of the respective visual indications to interact with one or more of the physical sensor and the communication device; and based on the interaction, one or more of: retrieve the sensor data; initiate communication with the communication device; and send the sensor data to the communication device.

Hereafter, workflows may be interchangeably referred to as safety workflows as it is understood that workflows as described herein may be used to implement procedures and/or processes related to safety and/or public safety of persons and/or personnel, for example at a school, a hospital, an airport, a sporting event, a stadium, a factory, a warehouse and/or any other suitable location and/or building and the like. Hereafter, the workflow server 102 may be interchangeably referred to as a computing device (e.g., which may be implemented as one or more computing devices, one or more servers, one or more cloud computing devices, and the like). Hereafter, it is understood that any of the sensors 138, cameras 142, and IoT devices 163 comprise physical sensors that may generate sensor data that may be provided to the workflow server 102 to determine whether a trigger has occurred.

However, the system 100 and safety workflows provided herein may be further adapted to include other features.

Figure 11:
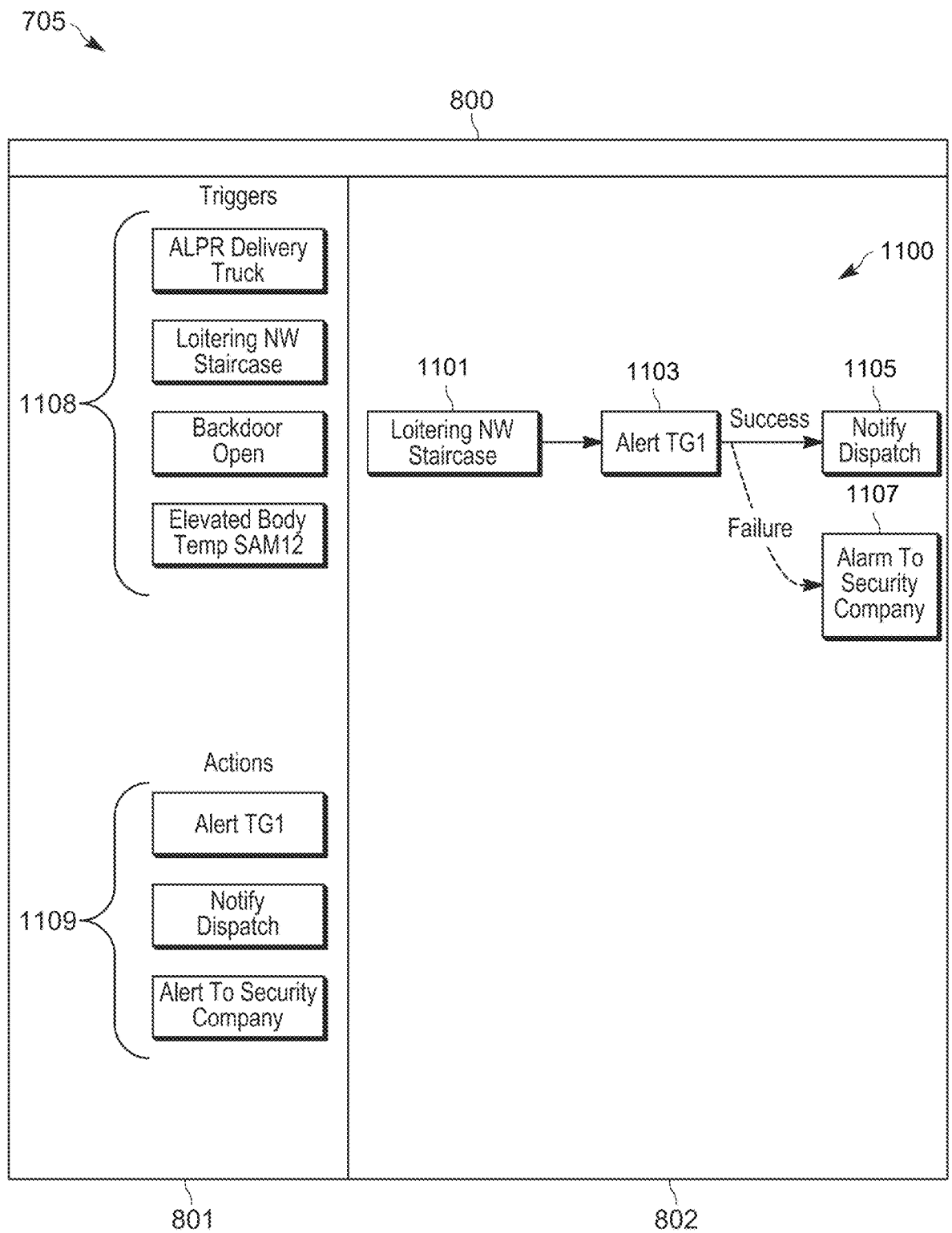
FIG. 11 depicts the dashboard of FIG. 8 with other example workflows that include conditional workflows, in accordance with some examples.

For example, as illustrated in FIG. 11, a trigger may result in a message being transmitted to a talkgroup, and further responsive actions may occur depending on whether transmission and/or delivery of the message to the talkgroup succeeds or fails.

In particular, as depicted, a workflow 1100 includes a trigger 1101 of "Loitering NW Staircase" and a responsive action 1103 of "Alert TG1". In particular, the responsive action 1103 results in a message being transmitted to communication devices of a particular talkgroup (e.g. Talkgroup #1) of radios which may include, but is not limited to, a talkgroup of the radios 137 and/or the radios 153. Such a message may include a text message of any suitable format and/or content, such as "Loitering on NW Staircase Detected" as well as an address of the building at which the staircase is located.

As depicted, when transmission and/or delivery of the message is determined to be a success, a responsive action 1105 of "Notify Dispatch" occurs (e.g. the dispatch center 131 is notified using any suitable notification process). However, when transmission and/or delivery of the message is determined to be a failure, a responsive action 1107 of sending an "Alarm To Security Company" occurs (e.g. an alarm and/or notification is provided to a communication device of a security company that monitors a building where the "NW Staircase" of the trigger 1101 is located, which may include, but is not limited to, a dispatch center, such as a dispatch center 1204 depicted in FIG. 12, that manages and/or communicates with the radios 153, similar to the dispatch center 131, but a component of the private radio system 150).

However, determining whether a message was successfully transmitted and/or delivered may depend on a message confirmation process over which the message was transmitted. Hereafter, examples will be described with respect to the private radio system 150, and will refer to one or more radios 153 being members of a talkgroup, such as the Talkgroup #1 of the action 1103, as well as the system infrastructure 152. However, methods and examples described herein may alternatively be applied to public-safety network 130, the radios 137 being members of a talkgroup, and the RAN 135. However, methods and examples described herein may alternatively be applied to combinations of the network 130 and the system 150, combinations of the radios 137, 153 and combinations of the system infrastructure 152 and the RAN 135.

Using the example of the system 150, when a message is transmitted to a talkgroup of the radios 153 via the system infrastructure 152, the system infrastructure 152 may operate according to one of a plurality of different message confirmation processes.

For example, the system infrastructure 152 may operate according to an acknowledgement confirmation process in which communication devices affiliated with a talkgroup acknowledge a message when received. In particular, the radios 153 may, when a message is received, acknowledge the message by transmitting such an acknowledgement. Furthermore, such acknowledgements may occur via polling of the communication devices affiliated with the talkgroup.

It is understood that the acknowledgement confirmation process may further depend on whether or not there are communication devices affiliated with the talkgroup, and that, when no communication devices are affiliated with the talkgroup, the system infrastructure 152 may alternatively implement a non-acknowledgement confirmation process, as described hereafter.

In particular, talkgroup affiliation is understood to be a process in which communication devices register with components of a network as currently being associated with and/or tuned to the talkgroup (and/or a channel thereof). Hence, when a network supports talkgroup affiliation, components of such a network may maintain lists of communication devices that are currently affiliated with a talkgroup.

However, in other examples, the system infrastructure 152 may operate according to a non-acknowledgement confirmation process in which communication devices communicating over a talkgroup do not acknowledge a message when received. Indeed, in these examples, the system infrastructure 152 may not support talkgroup affiliation, but rather messages transmitted on a talkgroup are transmitted over a channel and communication devices tuned to the channel receive the message; however, components of the system infrastructure 152 may not generally maintain lists of which communication devices are currently tuned to a channel of the talkgroup. Furthermore, in these examples, while the system infrastructure 152 may not support talkgroup affiliation, a radio 153 may be configured to communicate via one or more talkgroups, for example using a radio channel selector that may be used to "tune" the radio 153 to one or more channel positions corresponding to respective channels of respective talkgroups. Nonetheless, components of the system infrastructure 152 may indicate that the message was transmitted. Hence, in some examples, the system infrastructure 152 may operate according to a non-acknowledgement confirmation process and without talkgroup affiliation; in these examples, the system infrastructure 152 does not operate according to the acknowledgement confirmation process.

In yet other examples, the system infrastructure 152 may operate according to a radio-frequency (RF) based confirmation process in which power, and the like, of RF signals are monitored in a given time period following transmission of a message to communication devices (e.g. the time period comprising a time slot in which the communication devices may reply to the message). When the RF signals (e.g. a power of the RF signals) are above (e.g. or equal to) a given threshold, delivery of the message may be determined to be successful; however, when the RF signals (e.g. a power of the RF signals) are below the given threshold, delivery of the message may be determined to be a failure. In particular, power (and the like) of the RF signals may indicate whether, or not, the communication devices are replying to the message, and the given threshold may be selected to correspond with a strength (e.g. with respect to power) of an RF signal of a reply to the message by one or more of the communication devices. The given threshold may be determined heuristically. It is understood that, in these examples, components of the system infrastructure 152 are configured to measure power, and the like, of RF signals on a channel that corresponds to a talkgroup.

The term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like. Indeed, groups of channels may be logically organized into talkgroups, and/or dynamically allocated into talkgroups, though channels in a talkgroup may be dynamic as the traffic (e.g. communications) in a talkgroup may increase or decrease, and channels assigned to the talkgroup may be adjusted accordingly. Furthermore, talkgroups may be used in non-trunking communication systems as well as trunking communication systems.

It is further understood that, when a message is transmitted in conjunction with implementing the responsive action 1103, the workflow server 102 has no "knowledge" of a type of network over which communication devices of the associated talkgroup are communicating. Hence determining whether the message of the responsive action 1103 has been one or more of transmitted and delivered to the communication devices may be challenging as how such a determination is implemented is generally dependent on a type of network over which communication devices.

For completeness, also depicted in FIG. 11 are triggers 1108 and responsive actions 1109 (e.g. at the selection panel 801) from which the trigger 1101 and responsive actions 1103, 1105, 1107 may be selected. As depicted, the triggers 1108 are similar to the triggers 806, however responsive actions 1109 include only the responsive actions 1103, 1105, 1107. Nonetheless, it is understood that the triggers 1108 and responsive actions 1109 may be the same, and/or different as, respectively, the triggers 806 and responsive actions 807.

Furthermore, it is understood that, as depicted, the dashboard 800 as depicted in FIG. 11 has been adapted (e.g. relative to the dashboard 800 as depicted in FIG. 10) to include respective "success" and "failure" lines that may be selected to respectively draw between the responsive action 1103, and the responsive actions 1105, 1107.

Figure 12:
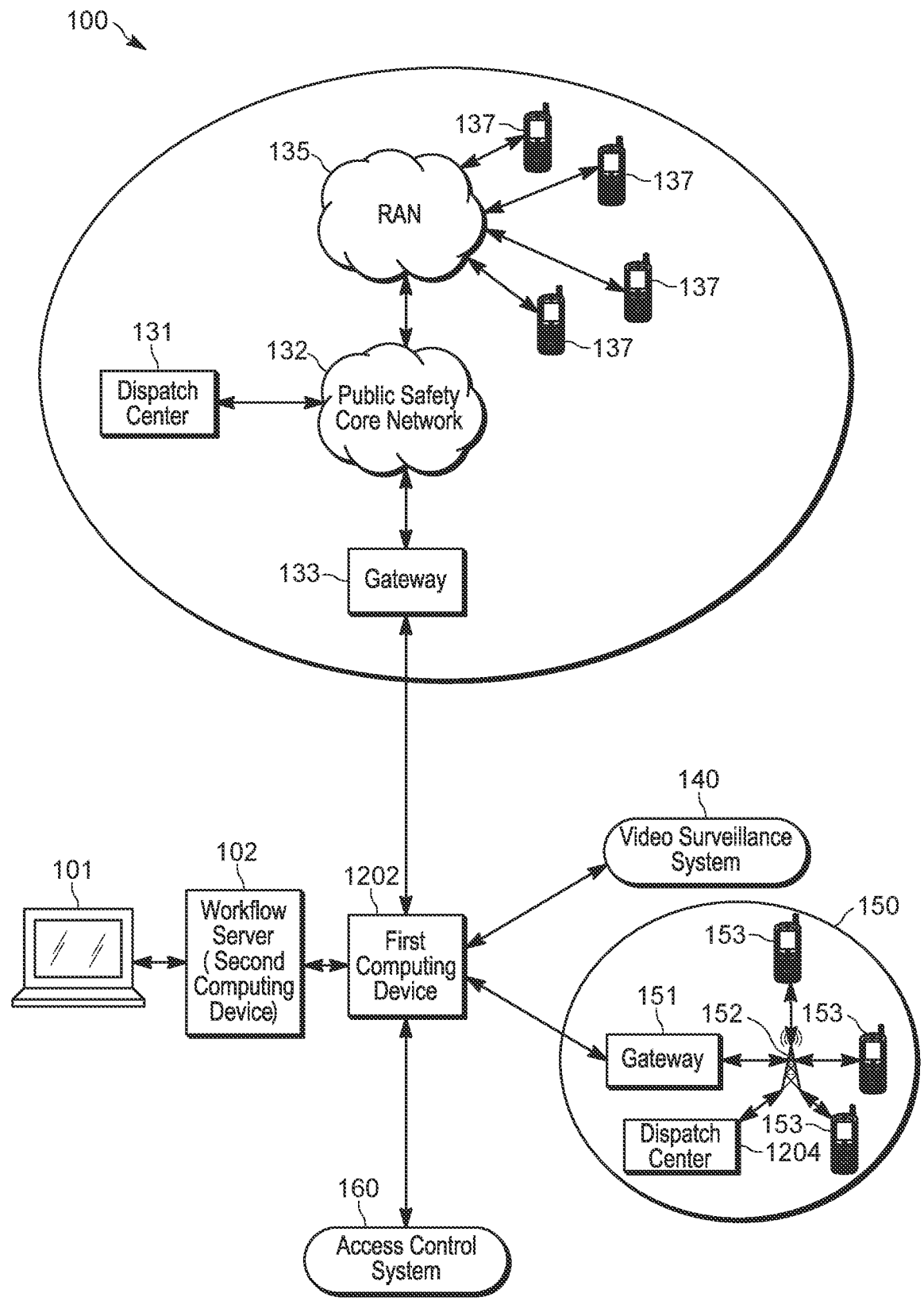
FIG. 12 depicts a portion of the system of FIG. 1 adapted to implement a method for controlling workflows based on network confirmation processes, in accordance with some examples.

Attention is next directed to FIG. 12 which depicts a portion of the system 100 that has been adapted to include a first computing device 1202 in communication with the workflow server 102 (e.g. which may be interchangeably referred to hereafter as the second computing device 102), the network 130, and the systems 140, 150, 160. FIG. 12 further shows a plurality of radios 153 in communication with the system infrastructure 152 and, for completeness, a plurality of radios 137 in communication with the RAN 135.

In particular, the first computing device 1202 may comprise a network infrastructure device and/or cloud computing device, and the like, via which the workflow server 102 may transmit messages to the network 130, and the systems 140, 150, 160. Hence, it is understood that, while the first computing device 1202 is not depicted in FIG. 1 to FIG. 5, the first computing device 1202 may nonetheless be present.

Furthermore, the first computing device 1202 may alternatively be a component of one or more the system 150 and the gateway 151, and/or a component of the network 130 and/or the gateway 133, depending on for which the system 150 and/or the network 130 the first computing device 1202 is configured to functionality.

It is furthermore, understood that the first computing device 1202 may be provisioned with information and/or data indicative of message confirmation processes used by the various networks which the network 130, and the systems 140, 150, 160 use to acknowledge delivery and/or transmission of messages to respective communication devices, as described above (e.g. an acknowledgement confirmation process, a non-acknowledgement confirmation process, an RF-based based confirmation process, a combination thereof, and the like). In particular, according to present examples, the first computing device 1202 may be provisioned with information and/or data indicative of message confirmation processes used by the various the system 150, as described below.

As depicted, the system 150 further includes a dispatch center 1204 that may be in communication with the radios 153 via the system infrastructure 152. In particular, the dispatch center 1204 may comprise a dispatch of a private security company, and the like, that manages the radios 153. It is understood, with brief reference back to FIG. 11, that when the responsive action 1105 occurs, the dispatch center 131 may be notified, whereas when the responsive action 1107 occurs, the dispatch center 1204 may be notified.

Figure 13:
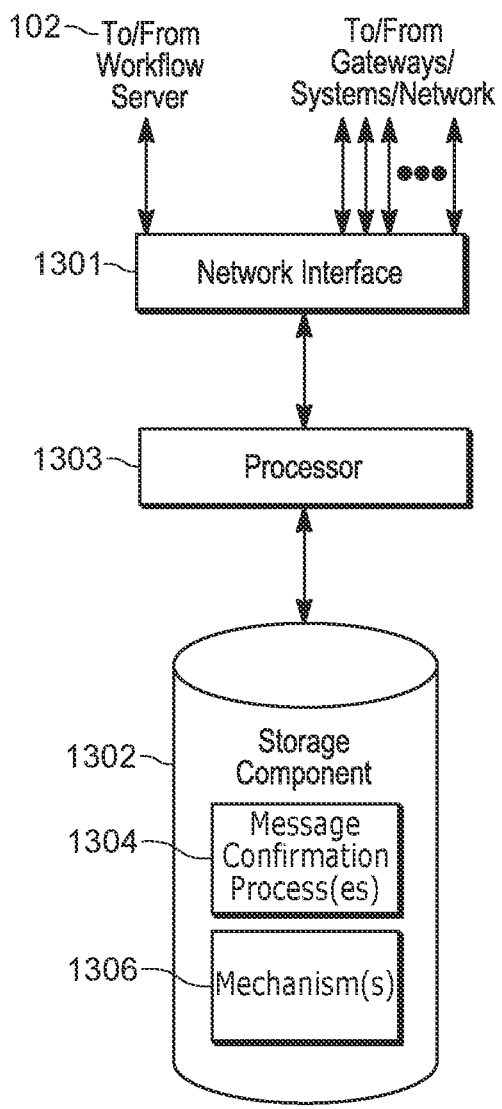
FIG. 13 is a block diagram of a computing device that implements a method for controlling workflows based on network confirmation processes, in accordance with some examples.

Attention is next directed to FIG. 13 which depicts a block diagram of the first computing device 1202 of FIG. 12. As shown, the first computing device 1202 comprises a network interface 1301, a storage component 1302 (e.g., as depicted a database, but may comprise any suitable memory and/or storage component), and a processor 1303. The processor 1303 is understood to include any suitable logic circuitry.

The network interface 1301 includes any suitable components for communicating with other suitable components of the system 100, in particular, as depicted, the workflow server 102, the gateways 133, 141, 151, 162 of the network 130 and the systems 140, 150, and 160, and the like. Components of the network interface 1301 include any suitable processing, modulating, and transceiver components that are operable in accordance with any one or more standard or proprietary wireless interfaces, wherein some of the functionality of the processing, modulating, and transceiver components may be performed by means of the processor 1303 through programmed logic such as software applications or firmware stored on the storage component 1302 (e.g., standard random access memory) or through hardware. The network interface 1301 may include any suitable wired or wireless network interfaces, including, but not limited to, Ethernet interfaces, T1 interfaces, USB interfaces, IEEE 802.11b interfaces, IEEE 802.11g interfaces, and the like.

The processor 1303 may comprise a digital signal processor (DSP), general purpose microprocessor, a programmable logic device, or application specific integrated circuit (ASIC), and the like, and is generally configured to receive messages, and the like, from the workflow server 102, and received information and/or indications associated with messages from various gateways, systems, and networks (e.g., of the system 100).

The storage component 1302 may comprise standard memory (such as Random Access Memory (RAM), Read Only Memory (ROM), and the like) and generally serves to store information 1304 indicative of message confirmation processes used by networks over which various communication devices of the system 100 communicate.

Furthermore, as depicted, the storage component 1302 stores mechanisms 1306 for determining success or failure of one or more of transmission or delivery of messages which depend on the information 1304 indicative of message confirmation processes. For example, the information 1304 may indicate whether a given network supports talkgroup affiliation and/or whether a given network operates according to an acknowledgement confirmation process or a non-acknowledgement confirmation process and/or whether a given network operates according to an RF-based confirmation process.

Put another way, a mechanism 1306 for determining success or failure of one or more of transmission or delivery of a message may depend on a message confirmation process of a network used to send the message. A given mechanism 1306 may comprise a set of instructions for determining success or failure of one or more of transmission or delivery of a message based on a message confirmation process of a given network over which the message was transmitted.

More particularly, when the processor 1303 receives a message from the workflow server 102, which may be addressed and/or to a particular talkgroup of the radios 153 and/or any other suitable communication devices, the processor 1303 may access the storage component 1302 to select, using the information 1304, a mechanism 1306 for determining success or failure of one or more of transmission or delivery of the message based on a message confirmation process (e.g. as indicated by the information 1304) of a given network which the radios 153, and/or any other suitable communication devices use to communicate, including, but not limited to receiving the message, among other possibilities. The processor 1303 may generally further implement the method described below with respect to FIG. 14, described in more detail below.

Figure 14:
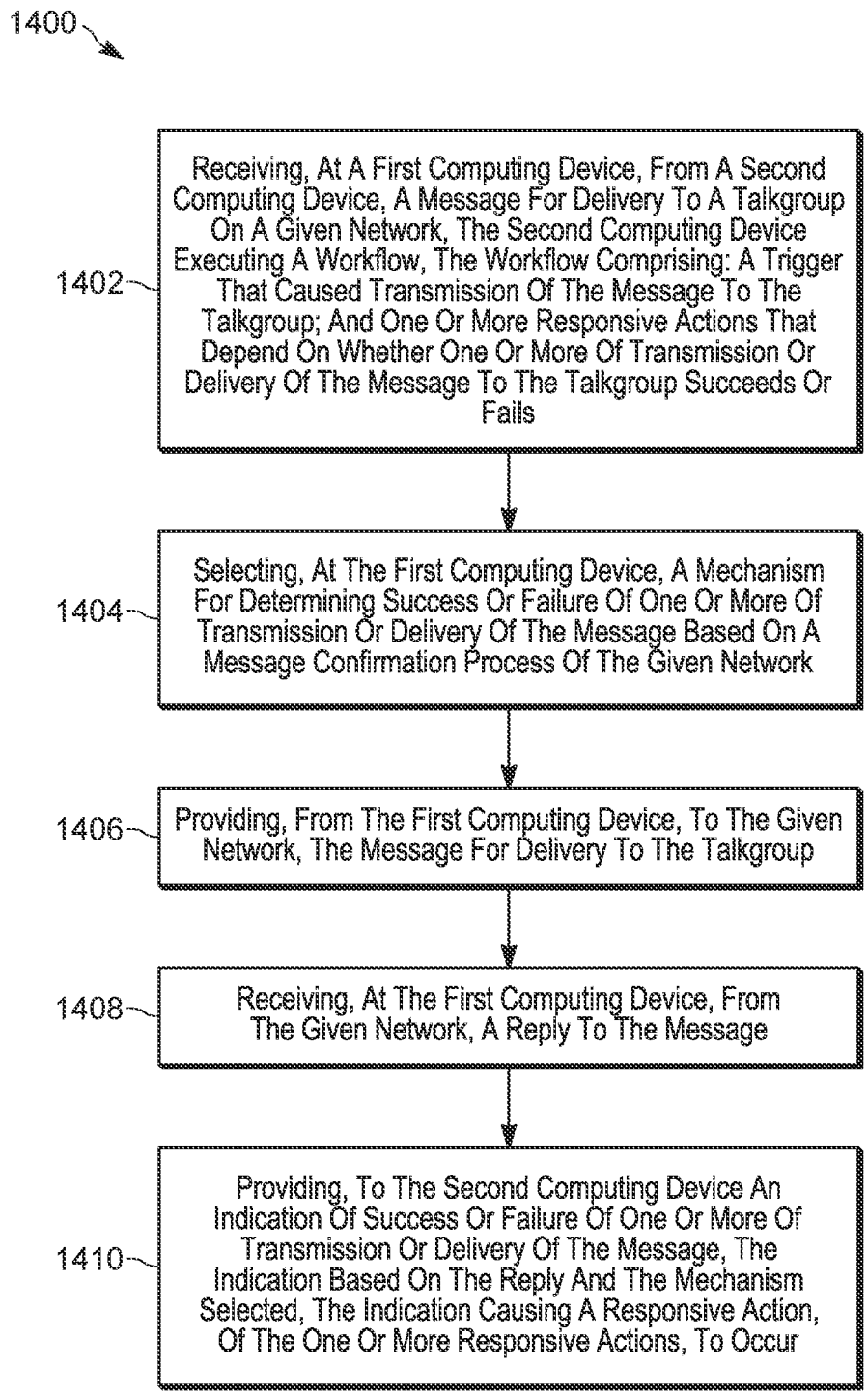
FIG. 14 depicts a flowchart of a method for controlling workflows based on network confirmation processes, in accordance with some examples.

Attention is now directed to FIG. 14, which depicts a flowchart representative of a method 1400 for controlling workflows based on network confirmation processes. The operations of the method 1400 of FIG. 14 correspond to machine readable instructions that are executed by the first computing device 1202, and specifically the processor 1303. In the illustrated example, the instructions are represented by the blocks of FIG. 14 and may be stored at the storage component 1302. The method 1400 of FIG. 14 is one way that the processor 1303 and/or the first computing device 1202 and/or the system 100 may be configured. Furthermore, the following discussion of the method 1400 of FIG. 14 will lead to a further understanding of the system 100, and its various components.

The method 1400 of FIG. 14 need not be performed in the exact sequence as shown and likewise various blocks may be performed in parallel rather than in sequence. Accordingly, the elements of method 1400 are referred to herein as "blocks" rather than "steps." The method 1400 of FIG. 14 may be implemented on variations of the system 100 of FIG. 1, as well.

Furthermore, communication between the processor 1303 and/or the first computing device 1202, and other components of the system 100, are understood to occur via the network interface 1301.

At a block 1402, the processor 1303 and/or the first computing device 1202 receives, from the second computing device 102 (e.g. the workflow server 102), a message for delivery to a talkgroup on a given network, the second computing device 102 executing a workflow, the workflow comprising: a trigger that caused transmission of the message to the talkgroup; and one or more responsive actions that depend on whether one or more of transmission or delivery of the message to the talkgroup succeeds or fails.

In one example, the workflow of the block 1402 may comprise the safety workflow 1100, and the trigger of the block 1402 may comprise the trigger 1101. Similarly, transmission of a message to a talkgroup of the block 1402 may comprise implementation of the responsive action 1103, and hence the one or more responsive actions, of the block 1402, that depend on whether one or more of transmission or delivery of the message to the talkgroup succeeds or fails, may comprise the responsive action 1105 (e.g. for when one or more of transmission or delivery of the message to the talkgroup succeeds) or the responsive action 1107 (e.g. for when one or more of transmission or delivery of the message to the talkgroup fails).

For simplicity, hereafter, the method 1400 will be described with respect to the example of the second computing device 102 (e.g. the workflow server 102) transmitting a message to a talkgroup due to the responsive action 1103 being implemented as a result of the trigger 1101 occurring. Hence, whether the responsive action 1105 occurs, or the responsive action 1107 occurs, will depend on whether one or more of transmission or delivery of the message to the talkgroup succeeds or fails.

For further simplicity, hereafter, the method 1400 will be described with respect to the example of the message being transmitted via the system infrastructure 152 to a talkgroup of the radios 153. Hence, in these examples, the given network of the block 1402 may comprise the system infrastructure 152 and/or a network of the system 150 that includes the system infrastructure 152. Hence, it is further assumed hereafter that the information 1304 indicates a message confirmation process of the system infrastructure 152, and that the mechanisms 1306 include a mechanism 1306 for determining whether one or more of transmission or delivery of the message to the talkgroup succeeds or fails.

At a block 1404, the processor 1303 and/or the first computing device 1202 selects a mechanism 1306 for determining success or failure of one or more of transmission or delivery of the message based on a message confirmation process of the given network. For example, the mechanism 1306 may depend on whether the message confirmation process is an acknowledgement confirmation process, a non-acknowledgement confirmation process, an RF-based confirmation process, and/or a combination thereof.

For example, a given network may support more than one message confirmation process, and which message confirmation process may depend on certain conditions. For example, a given network may support an acknowledgement confirmation process, but such an acknowledgement confirmation process may occur when communication devices are affiliated with talkgroup to which a message is sent. If no communication devices are affiliated with the talkgroup, either a determination of delivery of the message failing may occur or, if the given network also supports an RF-based confirmation process, the RF-based confirmation process may be implemented.

Figure 15:
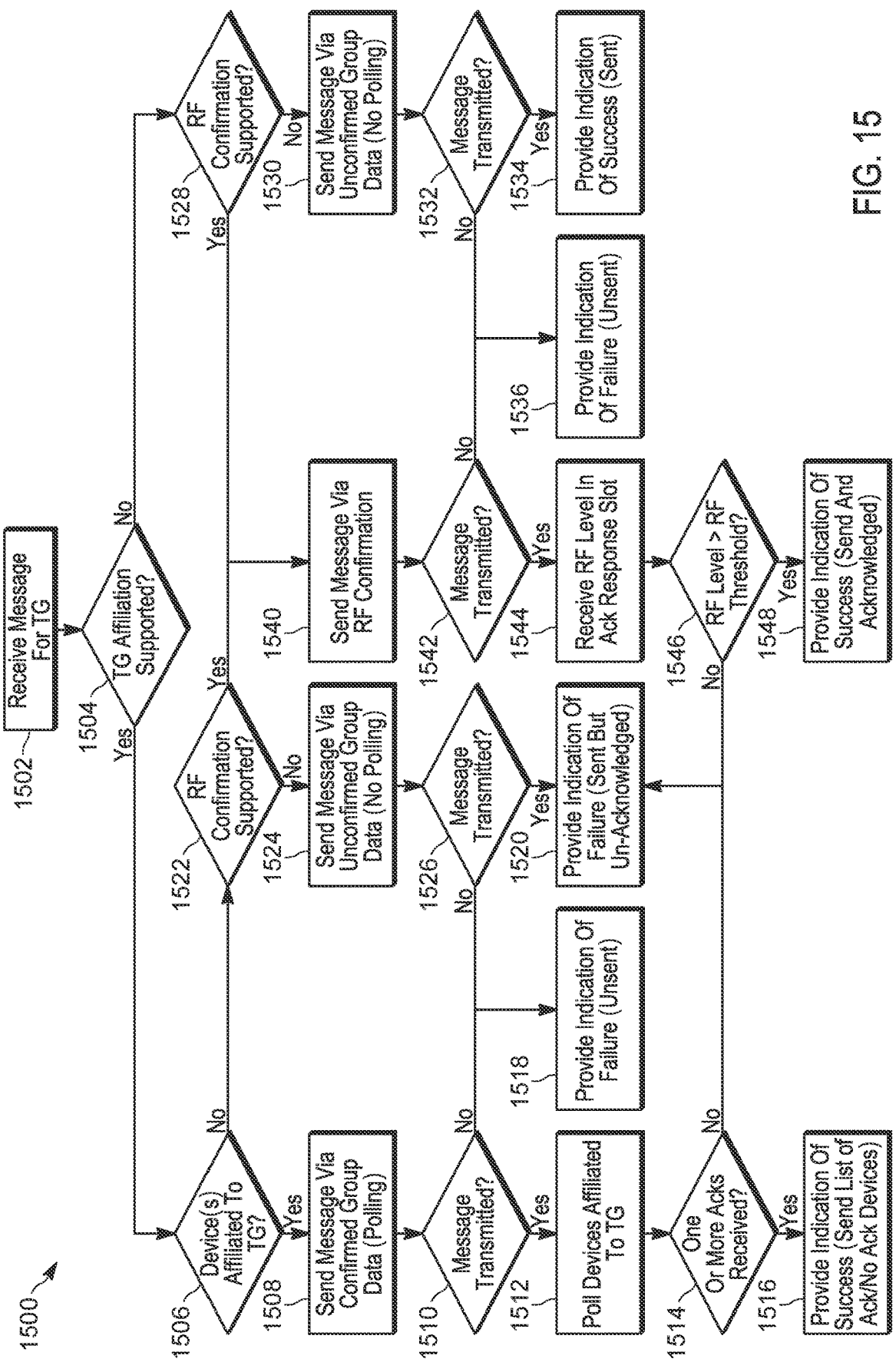
FIG. 15 depicts a flowchart of a more detailed method for controlling workflows based on network confirmation processes, in accordance with some examples.

Various mechanisms 1306 for determining success or failure of one or more of transmission or delivery of the message based on a message confirmation process of the given network are described in more detail with respect to FIG. 15.

However, it is generally understood that the message confirmation process of the given network is based on one of: an acknowledgement delivery process; a non-acknowledgement confirmation process; an RF-based confirmation process; or a combination of the acknowledgement confirmation process and the RF-based confirmation process. For example, a network that operates according to an acknowledgement delivery process may optionally operate according to an RF-based confirmation process when no communication devices are affiliated with a talkgroup to which a message is transmitted.

Indeed, a message confirmation process of a given network may further depend on whether the given network supports talkgroup affiliation or not. Indeed, a given network that supports talkgroup affiliation may operate according to an acknowledgement delivery process, or a combination of the acknowledgement confirmation process and an RF-based confirmation process.

However, a given network that does not support talkgroup affiliation may operate according to a non-acknowledgement delivery process, or an RF-based confirmation process.

It is hence understood that the message confirmation process further defines capability of the given network, such that selecting the mechanism 1306 for determining success or failure of delivery of the message is based on the capability of the given network. For example, the given network may or may not be capable of talkgroup affiliation and/or the given network may or not be capable of an RF-based confirmation process.

At a block 1406, the processor 1303 and/or the first computing device 1202 provides, to the given network, the message for delivery to the talkgroup. For example the message, such as a text message, may be transmitted to the talkgroup by the first computing device 1202 via a base station and/or base station controller and/or repeater, and the like, of the given network. It is understood that the base station and/or base station controller and/or repeater may implement certain processes in accordance with the message confirmation process of the given network. For example, when the message confirmation process comprises an acknowledgement confirmation process, the base station and/or base station controller and/or repeater may return, to the first computing device 1202, acknowledgments received from the communication devices. Similarly, when the message confirmation process comprises a non-acknowledgement confirmation process, the base station and/or base station controller and/or repeater may return, to the first computing device 1202, an indication of having transmitted the message to the communication devices to the first computing device 1202. Similarly, when the message confirmation process comprises an RF-based confirmation process, the base station and/or base station controller and/or repeater may return, to the first computing device 1202, an indication of the strength of an RF signal within a given time period after transmitting the message.

While certain components of a given network, such a base station and/or a base station controller and/or a repeater, are described as performing certain actions herein, it is understood that such action may be performed by any suitable components of the given network. When such a component comprises a repeater, the repeater may comprise any suitable repeater, such as an SLR Series Repeater (e.g., SLR 1000, SLR 5000, or SLR8000 repeater) configured to provide two-way radio service to the radios 153, amongst other possibilities.

In some examples, providing, from the first computing device 1202, to the given network, the message for delivery to the talkgroup occurs according to the message confirmation process of the given network (e.g. as determined at the block 1402 and/or the block 1404). For example, depending on whether the given network operates according to an acknowledgement confirmation process or a non-acknowledgement confirmation process and/or an RF-based confirmation process, a format of the message, and/or metadata thereof, may vary, and/or procedures and/or processes implemented in conjunction with providing the message may vary. For example, when the given network operates according to an acknowledgement confirmation process, communication devices affiliated with the talkgroup to which the message is transmitted may be polled for acknowledgements; such polling does not occur when the given network operates according to a non-acknowledgement confirmation process and/or when an RF-based confirmation process is implemented.

At a block 1408, the processor 1303 and/or the first computing device 1202 receives, from the given network, a reply to the message. The reply may depend on the message confirmation process of the given network and may be received from the base station and/or base station controller and/or repeater, and the like, of the given network. For example, as described herein, when the message confirmation process comprises an acknowledgement confirmation process, the base station and/or base station controller and/or repeater may return, to the first computing device 1202, acknowledgments received from the communication devices. Similarly, when the message confirmation process comprises a non-acknowledgement confirmation process, the base station and/or base station controller and/or repeater may return, to the first computing device 1202, an indication of having transmitted the message to the communication devices to the first computing device 1202. Similarly, when the message confirmation process comprises an RF-based confirmation process, the base station and/or base station controller and/or repeater may return, to the first computing device 1202, an indication of the strength of an RF signal (e.g. a power of the RG signal on a channel of the talkgroup) within a given time period after transmitting the message.

At a block 1410, the processor 1303 and/or the first computing device 1202 provides, to the second computing device 102 (e.g. the workflow server 102) an indication of success or failure of one or more of transmission or delivery of the message, the indication based on the reply and the mechanism selected, the indication causing a responsive action, of the one or more responsive actions, to occur.

Examples of indications of the block 1408 are described hereafter, for example with respect to FIG. 15. However, such indications are understood to indicate success or failure of one or more of transmission or delivery of the message, and, when received at the second computing device 102 (e.g. the workflow server 102), the second computing device 102 (e.g. the workflow server 102) determines whether to implement the responsive action 1105 (e.g. when an indication indicates "Success", and the like) or the responsive action 1107 (e.g. when an indication indicates "Failure", and the like).

Attention is next directed to FIG. 15 which depicts a flowchart representative of a method 1500 for controlling workflows based on network confirmation processes, and, in particular, for implementing various mechanisms 1306 depending on a message confirmation process of a given network. It is understood that the method 1500 may represent a more detailed version of aspects of the method 1400. As such, similar to the method 1400, the operations of the method 1500 of FIG. 15 correspond to machine readable instructions that are executed by the first computing device 1202, and specifically the processor 1303. In the illustrated example, the instructions are represented by the blocks of FIG. 15 and may be stored at the storage component 1302. The method 1500 of FIG. 15 is one way that the processor 1303 and/or the first computing device 1202 and/or the system 100 may be configured. Furthermore, the following discussion of the method 1500 of FIG. 15 will lead to a further understanding of the system 100, and its various components.

The method 1500 of FIG. 15 need not be performed in the exact sequence as shown and likewise various blocks may be performed in parallel rather than in sequence. Accordingly, the elements of method 1500 are referred to herein as "blocks" rather than "steps." The method 1500 of FIG. 15 may be implemented on variations of the system 100 of FIG. 1, as well.

Furthermore, it is understood that aspects of the method 1500 may represent the mechanisms 1306.

At a block 1502, the processor 1303 and/or the first computing device 1202 receives a message for a talkgroup. The block 1502 generally corresponds to the block 1402 of the method 1400. It is understood that the message is received with metadata identifying the talkgroup to which the message is to be transmitted, as well as the given network over which the message is to be transmitted (e.g. the system infrastructure 152).

At a block 1504, the processor 1303 and/or the first computing device 1202 determines whether the given network supports talkgroup affiliation; such a determination may be indicated by the information 1304.

When talkgroup affiliation is supported (a "YES" decision at the block 1504), the processor 1303 and/or the first computing device 1202 determines whether any communication devices (e.g. any of the radios 153) are affiliated with the talkgroup. For example, the processor 1303 and/or the first computing device 1202 may communicate with components of the given network (e.g. a base station and/or base station controller and/or repeater, and the like, of the system infrastructure 152) to determine whether any communication devices are affiliated with the talkgroup; in some examples, the processor 1303 and/or the first computing device 1202 may maintain a list of communication devices affiliated with the talkgroup.

When at least one communication device is affiliated with the talkgroup (a "YES" decision at the block 1506), at a block 1508, the processor 1303 and/or the first computing device 1202 transmits and/or sends and/or provides the message to the talkgroup, for example by transmitting, and the like, the message to the given network (e.g. the system infrastructure 152) for distribution (e.g. transmission) to the communication devices affiliated with the talkgroup. In particular, the processor 1303 and/or the first computing device 1202 transmits and/or sends and/or provides the message to the talkgroup via "Confirmed Group Data" protocol, which may include any suitable protocol that includes polling, and the like, of communication devices affiliated with the talkgroup to determine whether the message was received. Polling may include transmitting, at respective time slots and/or time periods after transmission of the message, a request for an acknowledgement to respective communication devices affiliated with the talkgroup and receiving, at later respective time slots and/or time periods after transmission of the message, such acknowledgments. When no acknowledgments are received (for example when a communication device does not receive a message or a respective request for an acknowledgement), an indication of non-acknowledgment may be generated by the given network and returned; such an indication of non-acknowledgment may indicate that no acknowledgements were received, or a list of communication devices that did not return an acknowledgement. It is further understood that, in some examples, acknowledgments may be received from only a subset of the communication devices affiliated with the talkgroup and that the given network may provide an indication of such, for example in the form of a list of communication devices that did return an acknowledgement and the like. Regardless, receipt of an indication of an acknowledgment by at least one communication device is understood to indicate that the message was successfully received, as described in more detail below.

The combination of the blocks 1504, 1506 may represent an example of the block 1404 of the method 1400. For example, when the given network supports talkgroup affiliation and communication devices are affiliated with the talkgroup, an acknowledgment confirmation process (e.g. one of the mechanisms 1306) is selected.

Similarly, the block 1508 may represent an example of the block 1406 of the method 1400.

At a block 1510, the processor 1303 and/or the first computing device 1202 determines whether the message was transmitted, for example by the system infrastructure 152. For example, the system infrastructure 152 may transmit the message, as described above, and provide a confirmation to the processor 1303 and/or the first computing device 1202 that the message was transmitted. Alternatively, the system infrastructure 152 may transmit the message, as described above, and provide an indication to the processor 1303 and/or the first computing device 1202 that the message was not transmitted (e.g. there was a failure in the transmission due to, for example, network congestion, a power outage, and the like, amongst other possibilities).

When the message is transmitted (a "YES" decision at the block 1510), at a block 1512, the processor 1303 and/or the first computing device 1202 (e.g. and/or components of the system infrastructure 152) poll the communication devices affiliated with the talkgroup as described above.

At a block 1514, the processor 1303 and/or the first computing device 1202 determines whether one or more acknowledgements were received at the polling of the block 1512. When or more acknowledgements were received (a "YES" decision at the block 1514), at a block 1516, the processor 1303 and/or the first computing device 1202 provides an indication of success to the second computing device 102 (e.g. the workflow server 102) to cause the second computing device 102 (e.g. the workflow server 102) to implement the responsive action 1105.

Optionally, at the block 1516, the processor 1303 and/or the first computing device 1202 may provide, the second computing device 102 (e.g. the workflow server 102), with the indication of success, a list of communication devices that provided an acknowledgement during the polling and/or a list of communication devices that did not provide an acknowledgement during the polling. Such lists may be used for generating reports about message transmissions and/or workflow statistics, and the like, by the second computing device 102 (e.g. the workflow server 102).

The combination of the blocks 1510, 1512, 1514 may represent an example of the block 1408 of the method 1400. For example, the processor 1303 and/or the first computing device 1202 may receive an indication that a message has been transmitted (or an indication that the message was not transmitted) at the block 1510, and/or the processor 1303 and/or the first computing device 1202 may receive one or more acknowledgements at the block 1514 (or indications of non-acknowledgement).

Similarly, the block 1516 may represent an example of the block 1410 of the method 1400.

Indeed, from at least the blocks 1504, 1506, 1508, 1510, 1512, 1514 and 1516, and 1520 it is understood that, with respect to the method 1400, the message confirmation process of the given network (e.g. used to select a mechanism 1306 at the block 1404) may comprise an acknowledgement confirmation process in which communication devices affiliated with the talkgroup acknowledge the message when received. It is further understood that the reply from the given network (e.g. received at the block 1408) may indicate that one or more of the communication devices acknowledged the message, and, in response, the indication (e.g. of the block 1410) may indicate success of delivery of the message. It is further understood that the reply (e.g. received at the block 1408) from the given network may indicate that none of the communication devices acknowledged the message, and, in response, the indication (e.g. of the block 1410) may indicate failure of delivery of the message.

Put another way, the message confirmation process of the given network may comprise an acknowledgement confirmation process in which communication devices affiliated with the talkgroup acknowledge the message when received, the reply from the given network may indicate that none of the communication devices acknowledged the message, and the indication may indicate failure of delivery of the message.

Furthermore, from at least the blocks 1504, 1506, 1508, 1510, 1512, 1514 and 1516, and 1520 it is understood that, with respect to the method 1400, the message confirmation process of the given network (e.g. used to select a mechanism 1306 at the block 1404) may comprise an acknowledgement confirmation process in which communication devices affiliated with the talkgroup acknowledge the message when received, and, when no communication device acknowledge the message, the reply (e.g. received at the block 1408) from the given network may indicate that none of the communication devices acknowledged the message, and the indication (e.g. of the block 1410) indicates failure of delivery of the message.

Returning to the block 1510, when the message was not transmitted (e.g. a "NO" decision at the block 1510), at a block 1518, the processor 1303 and/or the first computing device 1202 provides an indication of failure to the second computing device 102 (e.g. the workflow server 102) to cause the second computing device 102 (e.g. the workflow server 102) to implement the responsive action 1107. Optionally, the processor 1303 and/or the first computing device 1202 may provide the indication of failure with an indication that the message was not transmitted and/or that the message was unsent; such an indication may be used for generating reports about message transmissions and/or workflow statistics, and the like, by the second computing device 102 (e.g. the workflow server 102).

Returning to the block 1514, when no acknowledgments were received (e.g. a "NO" decision at the block 1514), at a block 1520, the processor 1303 and/or the first computing device 1202 provides an indication of failure to the second computing device 102 (e.g. the workflow server 102) to cause the second computing device 102 (e.g. the workflow server 102) to implement the responsive action 1107. Optionally, the processor 1303 and/or the first computing device 1202 may provide the indication of failure with an indication that the message transmitted and/or sent, but not acknowledged and/or unacknowledged; such an indication may be used for generating reports about message transmissions and/or workflow statistics, and the like, by the second computing device 102 (e.g. the workflow server 102).

It is understood that, the blocks 1518, 1520 may represent an example of the block 1410 of the method 1400.

Returning to the block 1506, when no communication devices are affiliated with the talkgroup (e.g. a "NO" decision at the block 1506), at a block 1522, the processor 1303 and/or the first computing device 1202 determines whether an RF-based confirmation process is supported by the given network to which the message is to be sent, for example as indicated by the information 1304.

When the given network does not support an RF-based confirmation process (e.g. a "NO" decision at the block 1522), at a block 1524, the processor 1303 and/or the first computing device 1202 transmits and/or sends and/or provides the message on the given network (e.g. with no communication devices associated with a talkgroup). In particular, the processor 1303 and/or the first computing device 1202 transmits and/or sends and/or provides the message for general transmission to communication devices on the given network on a channel associated with the talkgroup over which the message of the block 1502 is to be transmitted and/or to communication devices that were previously affiliated with the talkgroup (e.g. the components of the system infrastructure 152 and/or the first computing device 1202 may store a history of communication devices that were previously affiliated with the talkgroup) amongst other possibilities.

Put another way, the message may be transmitted via an "Unconfirmed Group Data" protocol which may include any suitable protocol that does not include polling, and the like, of communication devices affiliated with the talkgroup to determine whether the message was received.

At block 1526, the processor 1303 and/or the first computing device 1202 determines whether the message was transmitted; the block 1526 is similar to the block 1510. When the message was transmitted (e.g. a "YES" decision at the block 1526), the processor 1303 and/or the first computing device 1202 implements the block 1520, as described above. When the message was not transmitted (e.g. a "NO" decision at the block 1526), the processor 1303 and/or the first computing device 1202 implements the block 1518, as described above. Hence, whether the message is transmitted or not transmitted, an indication of failure is provided at the block 1520 or the block 1518, the difference being in the optional indications that may be provided with the respective indications of failure (e.g. an indication of sent but unacknowledged at the block 1520, or an indication of unsent at the block 1518).

Optionally, the blocks 1524, 1526 may not occur; rather, in response to a "NO" decision at the block 1522, the processor 1303 and/or the first computing device 1202 may provide an indication of failure at the block 1518 (e.g. indicating that the message was not transmitted).

It is understood that, the blocks 1506, 1522 may represent an example of the block 1404 of the method 1400, the block 1524 may represent an example of the block 1406 of the method 1400, and the block 1526 may represent an example of the block 1408 of the method 1400.

Returning to the block 1504, when talkgroup affiliation is not supported (e.g. a "NO" decision at the block 1504), at a block 1528, the processor 1303 and/or the first computing device 1202 determines whether an RF-based confirmation process is supported by the given network to which the message is to be sent, for example as indicated by the information 1304. The block 1528 is understood to be similar to the block 1522.

When the given network does not support an RF-based confirmation process (e.g. a "NO" decision at the block 1528), at a block 1530, the processor 1303 and/or the first computing device 1202 transmits and/or sends and/or provides the message on the given network (e.g. that does not support talkgroup affiliation). In particular, the processor 1303 and/or the first computing device 1202 transmits and/or sends and/or provides the message for general transmission to communication devices on the given network on a channel associated with the talkgroup over which the message of the block 1502 is to be transmitted.

Put another way, the message may be transmitted via the aforementioned "Unconfirmed Group Data" protocol which may include any suitable protocol that does not include polling, and the like, of communication to determine whether the message was received. The block 1530 is hence understood to be similar to the block 1524.

At block 1532, the processor 1303 and/or the first computing device 1202 determines whether the message was transmitted; the block 1532 is similar to the block 1510 and/or the block 1526. When the message was transmitted (e.g. a "YES" decision at the block 1532), at a block 1534, the processor 1303 and/or the first computing device 1202 provides an indication of success to the second computing device 102 (e.g. the workflow server 102) to cause the second computing device 102 (e.g. the workflow server 102) to implement the responsive action 1105.

Optionally, at the block 1534, the processor 1303 and/or the first computing device 1202 may provide, the second computing device 102 (e.g. the workflow server 102), with the indication of success, an indication that the message was transmitted and/or sent, which may be used for generating reports about message transmissions and/or workflow statistics, and the like, by the second computing device 102 (e.g. the workflow server 102).

Returning to the block 1532, when the message was not transmitted (e.g. a "NO" decision at the block 1532), the processor 1303 and/or the first computing device 1202 implements the block 1536 which is understood to be similar to the block 1518, as described above.

It is understood that, the blocks 1504, 1528 may represent an example of the block 1404 of the method 1400, the block 1530 may represent an example of the block 1406 of the method 1400, the block 1532 may represent an example of the block 1408 of the method 1400, and the blocks 1534, 1536 may represent examples of the block 1410 of the method 1400.

Indeed, from at least the blocks 1528, 1530, 1532, 1534 and 1536, it is understood that, with respect to the method 1400, that the message confirmation process of the given network (e.g. used to select a mechanism 1306 at the block 1404) may comprise a non-acknowledgement confirmation process in which communication devices affiliated with the talkgroup do not acknowledge the message when received. It is further understood that the reply from the given network (e.g. received at the block 1408) may indicate that the message was transmitted to the talkgroup, and the indication (e.g. of the block 1410) may indicate. success of transmission of the message. It is further understood that the reply from the given network (e.g. received at the block 1408) may indicate that the message was not transmitted to the talkgroup, and the indication indicates (e.g. of the block 1410) failure of transmission of the message.

Returning to the blocks 1522, 1528, when the processor 1303 and/or the first computing device 1202 determines that an RF-based confirmation process is supported (e.g. a "YES" decision at the block 1522 or the block 1528), at a block 1540, the processor 1303 and/or the first computing device 1202 transmits and/or sends and/or provides the message on the given network for example for general transmission to communication devices on the given network, but according to an RF confirmation protocol which requests that a component of the given network (e.g. a base station and/or a base station controller and/or a repeater) transmits on a channel associated with the talkgroup over which the message of the block 1502 is to be transmitted, and measure power of RF signals in a given time period after transmitting the message on the channel. The given time period may comprise a time period and/or time slot for any communication device that receives the message to reply to the message.

At a block 1542, the processor 1303 and/or the first computing device 1202 determines whether the message was transmitted; the block 1542 is understood to be similar to the block 1510 and/or the block 1526 and/or the block 1532 and/or the block 1542.

At a block 1544, the processor 1303 and/or the first computing device 1202 receives, for example from the component of the given network, of RF signals in the given time period after transmitting the message.

At a block 1546, the processor 1303 and/or the first computing device 1202 compares the RF power level to an RF threshold to determine whether the RF power level is greater than the RF threshold. When the RF power level is greater than the RF threshold (e.g. a "YES" decision at the block 1546), at a block 1548, the processor 1303 and/or the first computing device 1202 provides an indication of success to the second computing device 102 (e.g. the workflow server 102) to cause the second computing device 102 (e.g. the workflow server 102) to implement the responsive action 1105. Put another way, the RF power level being greater than the RF threshold indicates that one or more communication devices replied to the message.

Optionally, at the block 1548, the processor 1303 and/or the first computing device 1202 may provide, the second computing device 102 (e.g. the workflow server 102), with the indication of success, an indication that the message was transmitted and/or sent, and acknowledged. Such an indication that the message was transmitted and/or sent, and acknowledged may be used for generating reports about message transmissions and/or workflow statistics, and the like, by the second computing device 102 (e.g. the workflow server 102).

Returning to the block 1546, when the RF power level is not greater than the RF threshold (e.g. a "NO" decision at the block 1546), at a block 1548, the processor 1303 and/or the first computing device 1202 implements the block 1520, described above.

It is understood that the block 1540 may represent an example of the block 1406 of the method 1400, the block 1544 may represent an example of the block 1408 of the method 1400, and the blocks 1546, 1548, 1520 may represent examples of the block 1410 of the method 1400.

Indeed, from at least the blocks 1522, 1526, 1518, 1520, 1540, 1542, 1544, 1546 and 1548 it is understood that the method 1400 may further comprise determining that the message confirmation process of the given network comprises a radio-frequency (RF) based confirmation process. Furthermore, from at least the blocks 1522, 1526, 1518, 1520, 1540, 1542, 1544, 1546 and 1548 it is understood that: the reply from the given network (e.g. at the block 1408) may indicate that RF signals received in a time period following transmission of the message are above a given RF threshold, and the indication (e.g. of the block 1410) may indicate success of delivery of the message; or the reply e.g. at the block 1408) from the given network may indicate that RF signals received in the time period following transmission of the message are below the given RF threshold, and the indication (e.g. of the block 1410) may indicate failure of delivery of the message.

Indeed, from at least the blocks 1504, 1506, 1522, 1526, 1518, 1520, 1540, 1542, 1544, 1546 and 1548 it is further understood that the message confirmation process of the given network may further comprises an acknowledgement confirmation process in which communication devices affiliated with the talkgroup acknowledge the message when received, and when no communication device is affiliated with the talkgroup, the RF-based confirmation process may be implemented, or when one or more communication devices are affiliated with the talkgroup, the acknowledgement confirmation process may be implemented.

The method 1500 may include other aspects. For example, when a message confirmation process of a given network is based on combination of an acknowledgement delivery process and an RF-based confirmation process, it is understood if only one communication device responds to a message with an acknowledgement, the acknowledgement delivery process is used.

Furthermore, while the blocks 1544, 1546 have been described with respect to the first computing device 1202 receiving an RF power level from a component of a given network and performing a comparison with a threshold, in other examples, the comparison of the block 1544 may be performed by the component of the given network (e.g., such as a repeater, and the like, of the system infrastructure 152) which may provide an indication, to the first computing device 1202, of whether, or not, the RF power level is above or below the threshold. In these examples, the first computing device 1202 may perform the block 1548 when such an indication indicates that the RF power is above the threshold, and the first computing device 1202 may perform the block 1520 when such an indication indicates that the RF power is below the threshold.

Figure 16:
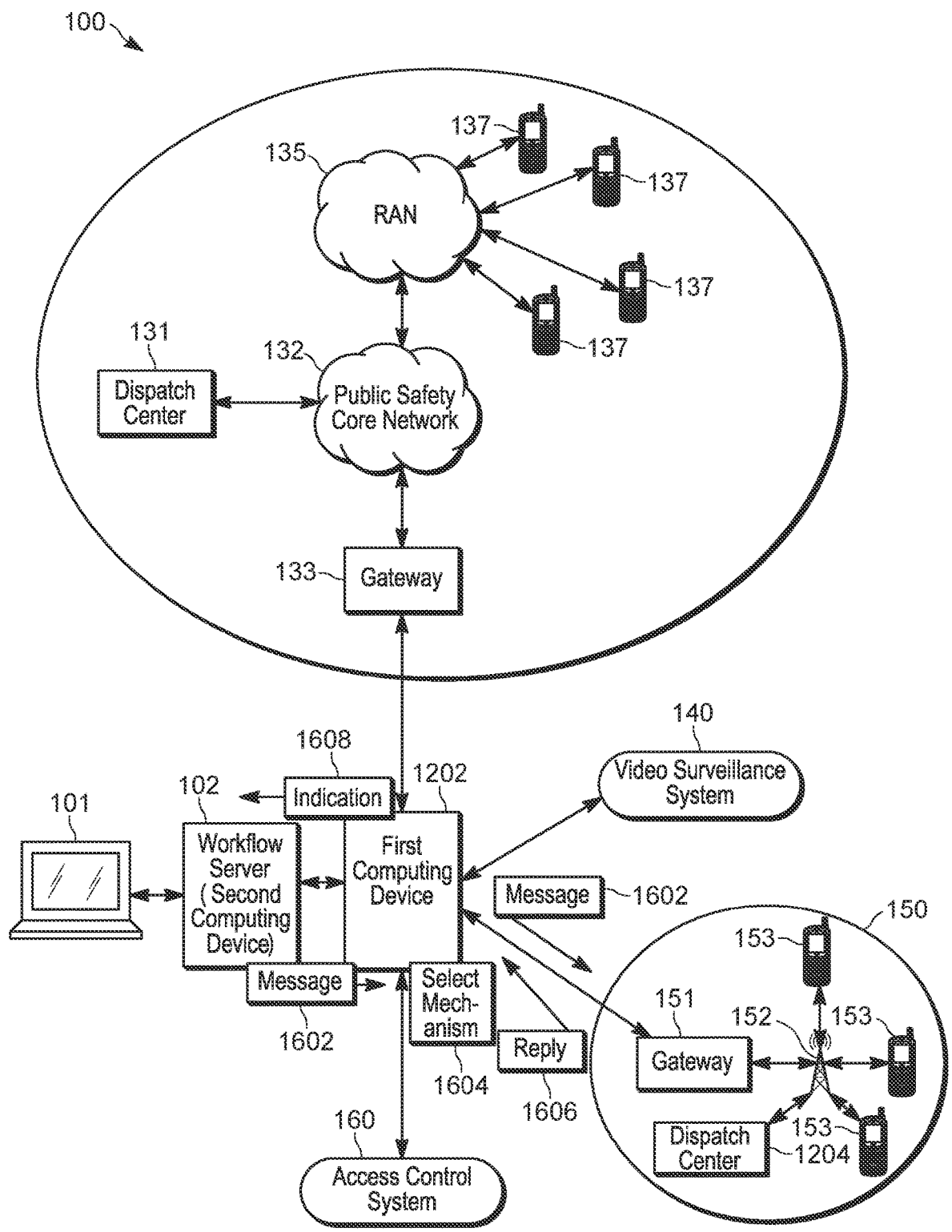
FIG. 16 depicts a portion of the system of FIG. 1 at least partially implementing a method for controlling workflows based on network confirmation processes, in accordance with some examples.

Attention is next directed to FIG. 16 which depicts an example of the method 1400. FIG. 16 is substantially similar to FIG. 12, with like components having like numbers. As depicted, the first computing device 1202 receives (e.g. at the block 1402 of the method 1400) a message 1602 from the second computing device 102 (e.g. the workflow server 102). The message 1602 is understood to be received with metadata, and the like, indicating a talkgroup to which the message 1602 is to be transmitted, and determines which network the talkgroup is associated with, and/or on which network communication devices of the talkgroup are communicating. The first computing device 1202 selects 1604 (e.g. at the block 1404 of the method 1400) a mechanism 1306 for determining success or failure of one or more of transmission or delivery of the message based on a message confirmation process of the given network, and provides (e.g. at the block 1406 of the method 1400) the message 1602 to the given network for delivery to the talkgroup. For example, as depicted, the message 1602 is transmitted to the system infrastructure 152 via the gateway 151 and the system 150. The first communication device 1202 receives (e.g. at the block 1408 of the method 1400), a reply 1606 to the message 1602, for example from a component of the system infrastructure 152 and provides (e.g. at the block 1410 of the method 1400), to the second computing device 102 (e.g. the workflow server 102) an indication 1608 of success or failure of one or more of transmission or delivery of the message. Indeed, it is understood that the reply 1606 may generally indicate success or failure of one or more of transmission or delivery of the message.

It is understood that when the indication 1608 indicates success of one or more of transmission or delivery of the message, the second computing device 102 (e.g. the workflow server 102) may notify the dispatch center 131 (e.g. via implementing the responsive action 1105). It is further understood that when the indication 1608 indicates failure of one or more of transmission or delivery of the message, the second computing device 102 (e.g. the workflow server 102) may alert a security company by transmitting an alarm and/or a notification to the dispatch center 1204.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, implement electronic workflows, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for implementing safety workflows having a message transmission success dependency, the method comprising:
    receiving, at a first computing device, from a second computing device, a message for delivery to a talkgroup on a given network, the second computing device executing a safety workflow, the safety workflow comprising: a trigger that caused transmission of the message to the talkgroup; and one or more responsive actions that depend on whether one or more of transmission or delivery of the message to the talkgroup is successful or unsuccessful;
    determining, at the first computing device, a type of the given network, wherein the type of the given network is one type of a plurality of given network types with which the first computing device is configured to communicate with, wherein the first computing device is configured to use different message confirmation processes for different network types;
    selecting, at the first computing device, a mechanism for determining success or failure of one or more of transmission or delivery of the message based on a message confirmation process of the given network, the message confirmation process being one of a plurality of message confirmation processes, available to the first computing device, that are dependent on the type of the given network, the message confirmation process selected on the basis of the type of the given network;
    providing, from the first computing device, to the given network, the message for delivery to the talkgroup;
    receiving, at the first computing device, from the given network, a reply to the message; and
    providing, to the second computing device an indication of success or failure of one or more of transmission or delivery of the message, the indication based on the reply and the mechanism selected, the indication causing a responsive action, of the one or more responsive actions, to occur.

2. The method of claim 1, wherein providing, from the first computing device, to the given network, the message for delivery to the talkgroup occurs according to the message confirmation process of the given network.

3. The method of claim 1, wherein the message confirmation process of the given network comprises an acknowledgement confirmation process in which communication devices affiliated with the talkgroup acknowledge the message when received, and
    wherein the reply from the given network indicates that one or more of the communication devices acknowledged the message, and in response, the indication indicates success of delivery of the message, or the reply from the given network indicates that none of the communication devices acknowledged the message, and in response, the indication indicates failure of delivery of the message.

4. The method of claim 1, wherein the message confirmation process of the given network comprises an acknowledgement confirmation process in which communication devices affiliated with the talkgroup acknowledge the message when received, and
    wherein the reply from the given network indicates that none of the communication devices acknowledged the message, and the indication indicates failure of delivery of the message.

5. The method of claim 1, wherein the message confirmation process of the given network comprises an acknowledgement confirmation process in which communication devices affiliated with the talkgroup acknowledge the message when received,
    wherein when no communication device is affiliated with the talkgroup, the reply from the given network indicates that none of the communication devices acknowledged the message, and the indication indicates failure of delivery of the message.

6. The method of claim 1, wherein the message confirmation process of the given network comprises a non-acknowledgement confirmation process in which communication devices affiliated with the talkgroup do not acknowledge the message when received,
    wherein the reply from the given network indicates that the message was transmitted to the talkgroup, and the indication indicates success of transmission of the message, or the reply from the given network indicates that the message was not transmitted to the talkgroup, and the indication indicates failure of transmission of the message.

7. The method of claim 1, wherein the message confirmation process of the given network comprises a radio-frequency (RF) based confirmation process, and
    wherein the reply from the given network indicates that RF signals received in a time period following transmission of the message are above a given RF threshold, the indication indicates success of delivery of the message, or the reply from the given network indicates that RF signals received in the time period following transmission of the message are below the given RF threshold, the indication indicates failure of delivery of the message.

8. The method of claim 7, wherein the message confirmation process of the given network further comprises an acknowledgement confirmation process in which communication devices affiliated with the talkgroup acknowledge the message when received, and
    wherein when no communication device is affiliated with the talkgroup, the RF-based confirmation process is implemented, or when one or more communication devices are affiliated with the talkgroup, the acknowledgement confirmation process is implemented.

9. The method of claim 1, wherein the message confirmation process of the given network is based on one of:
an acknowledgement delivery process;
a non-acknowledgement confirmation process; and
a combination of the acknowledgement confirmation process and an RF-based confirmation.

10. The method of claim 1, wherein the message confirmation process further defines capability of the given network, such that selecting the mechanism for determining success or failure of delivery of the message is based on the capability of the given network.

11. A device for implementing safety workflows having a message transmission success dependency, the device comprising:
a network interface; and
a processor configured to:
receive, from a second computing device, via the network interface, a message for delivery to a talkgroup on a given network, the second computing device executing a safety workflow, the safety workflow comprising: a trigger that caused transmission of the message to the talkgroup; and one or more responsive actions that depend on whether one or more of transmission or delivery of the message to the talkgroup is successful or unsuccessful;
determine a type of the given network, wherein the type of the given network is one type of a plurality of given network types with which the first computing device is configured to communicate with, wherein the processor computing device is configured to use different message confirmation processes for different network types;
select a mechanism for determining success or failure of one or more of transmission or delivery of the message based on a message confirmation process of the given network, the message confirmation process being one of a plurality of message confirmation processes available to the processor, that are dependent on the type of the given network, the message confirmation process selected on the basis of the type of the given network;
provide, from the first computing device, to the given network, via the network interface, the message for delivery to the talkgroup;
receiving, from the given network, via the network interface, a reply to the message; and
provide, via the network interface, an indication of success or failure of one or more of transmission or delivery of the message, the indication based on the reply and the mechanism selected, the indication causing a responsive action, of the one or more responsive actions, to occur.

12. The device of claim 11, wherein the processor is further configured to provide, to the given network, the message for delivery to the talkgroup according to the message confirmation process of the given network.

13. The device of claim 11, wherein the message confirmation process of the given network comprises an acknowledgement confirmation process in which communication devices affiliated with the talkgroup acknowledge the message when received, and
wherein the reply from the given network indicates that one or more of the communication devices acknowledged the message, and in response, the indication indicates success of delivery of the message, or the reply from the given network indicates that none of the communication devices acknowledged the message, and in response, the indication indicates failure of delivery of the message.

14. The device of claim 11, wherein the message confirmation process of the given network comprises an acknowledgement confirmation process in which communication devices affiliated with the talkgroup acknowledge the message when received, and
wherein the reply from the given network indicates that none of the communication devices acknowledged the message, and the indication indicates failure of delivery of the message.

15. The device of claim 11, wherein the message confirmation process of the given network comprises an acknowledgement confirmation process in which communication devices affiliated with the talkgroup acknowledge the message when received,
wherein when no communication device is affiliated with the talkgroup, the reply from the given network indicates that none of the communication devices acknowledged the message, and the indication indicates failure of delivery of the message.

16. The device of claim 11, wherein the message confirmation process of the given network comprises a non-acknowledgement confirmation process in which communication devices affiliated with the talkgroup do not acknowledge the message when received,
wherein the reply from the given network indicates that the message was transmitted to the talkgroup, and the indication indicates success of transmission of the message, or the reply from the given network indicates that the message was not transmitted to the talkgroup, and the indication indicates failure of transmission of the message.

17. The device of claim 11, wherein the message confirmation process of the given network comprises a radio-frequency (RF) based confirmation process, and
wherein the reply from the given network indicates that RF signals received in a time period following transmission of the message are above a given RF threshold, the indication indicates success of delivery of the message, or the reply from the given network indicates that RF signals received in the time period following transmission of the message are below the given RF threshold, the indication indicates failure of delivery of the message.

18. The device of claim 17, wherein the message confirmation process of the given network further comprises an acknowledgement confirmation process in which communication devices affiliated with the talkgroup acknowledge the message when received, and
wherein when no communication device is affiliated with the talkgroup, the RF-based confirmation process is implemented, or when one or more communication devices are affiliated with the talkgroup, the acknowledgement confirmation process is implemented.

19. The device of claim 11, wherein the message confirmation process of the given network is based on one of:
an acknowledgement delivery process;
a non-acknowledgement confirmation process; and
a combination of the acknowledgement confirmation process and an RF-based confirmation.

20. The device of claim 11, wherein the message confirmation process further defines capability of the given network, such that selecting the mechanism for determining success or failure of delivery of the message is based on the capability of the given network.

* * * * *